(12) United States Patent
Aznoe et al.

(10) Patent No.: US 11,684,110 B2
(45) Date of Patent: Jun. 27, 2023

(54) AUTOLACING FOOTWEAR

(71) Applicant: NIKE, Inc., Beaverton, OR (US)

(72) Inventors: Brian Aznoe, Beaverton, OR (US); Brendan Donohoe, Beaverton, OR (US); Andrew Owenson, Beaverton, OR (US); James Stevenson, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 38 days.

(21) Appl. No.: 16/557,096

(22) Filed: Aug. 30, 2019

(65) Prior Publication Data

US 2020/0068981 A1  Mar. 5, 2020

Related U.S. Application Data

(60) Provisional application No. 62/855,635, filed on May 31, 2019, provisional application No. 62/725,733, filed on Aug. 31, 2018.

(51) Int. Cl.
*A43B 3/34* (2022.01)
*A43C 11/16* (2006.01)
(Continued)

(52) U.S. Cl.
CPC ............... *A43B 3/34* (2022.01); *A43C 1/00* (2013.01); *A43C 7/08* (2013.01); *A43C 11/165* (2013.01);
(Continued)

(58) Field of Classification Search
CPC .... A43B 3/34; A43C 1/00; A43C 7/08; A43C 11/165; A43C 3/00; B21D 39/00; F61G 11/00; F61G 11/108
See application file for complete search history.

(56) References Cited

U.S. PATENT DOCUMENTS 5,157,813 A * 10/1992 Carroll ................. A43C 11/165
36/114
5,934,599 A * 8/1999 Hammerslag .......... A43C 11/00
242/396.2
(Continued)

FOREIGN PATENT DOCUMENTS

CN 107847016 3/2018
CN 211532910 9/2020
(Continued)

OTHER PUBLICATIONS

"Japanese Application Serial No. 2020-552359, Notification of Reasons for Rejection dated Apr. 27, 2021", w o English Translation, 2 pgs.
(Continued)

*Primary Examiner* — Katharine G Kane
(74) *Attorney, Agent, or Firm* — Schwegman, Lundberg & Woessner, P.A.

(57) ABSTRACT

An article of footwear, lacing engine, and method includes a motor, a transmission operatively coupled to the motor, and a lace spool. The lace spool is operatively coupled to the transmission and includes a top lace groove in a top surface of the lace spool and a circumferential channel, wherein the lace is configured to be inserted in the top lace groove and be taken up around the circumferential channel based on a turning of the lace spool from action by the motor and transmission. A fastener is configured to couple the lace spool to the transmission and is inserted into the lace spool via the top surface, the fastener having a head having a head width sufficient to partially cover the top lace groove, leaving a top gap having a gap width less than a thickness of the lace.

7 Claims, 24 Drawing Sheets

(51) Int. Cl.
*A43C 1/00* (2006.01)
*F16G 11/12* (2006.01)
*F16G 11/00* (2006.01)
*A43C 7/08* (2006.01)
*F16G 11/10* (2006.01)
*B21D 39/00* (2006.01)

(52) U.S. Cl.
CPC ............. *B21D 39/00* (2013.01); *F16G 11/00* (2013.01); *F16G 11/108* (2013.01); *F16G 11/12* (2013.01)

(56) References Cited

U.S. PATENT DOCUMENTS

| | | | | |
|---|---|---|---|---|
| 6,691,433 | B2* | 2/2004 | Liu | A43C 11/16 24/71 SK |
| 7,367,522 | B2* | 5/2008 | Chen | A43C 7/00 242/378.1 |
| 7,584,528 | B2* | 9/2009 | Hu | A43C 11/20 24/712.9 |
| 7,721,468 | B1* | 5/2010 | Johnson | A43C 1/06 36/118.1 |
| 8,713,820 | B2* | 5/2014 | Kerns | A43C 1/04 36/88 |
| 9,961,963 | B2* | 5/2018 | Schneider | A43C 7/00 |
| 10,046,942 | B2 | 8/2018 | Beers et al. | |
| 11,103,030 | B2* | 8/2021 | Bock | A43B 3/36 |
| 2005/0198867 | A1* | 9/2005 | Labbe | A43C 11/14 36/50.1 |
| 2008/0301919 | A1* | 12/2008 | Ussher | A43B 3/34 24/712.7 |
| 2008/0307673 | A1 | 12/2008 | Johnson | |
| 2009/0184189 | A1* | 7/2009 | Soderberg | A44B 11/02 242/395 |
| 2009/0272007 | A1* | 11/2009 | Beers | A43B 11/00 36/50.1 |
| 2009/0272013 | A1* | 11/2009 | Beers | A43B 3/0078 36/137 |
| 2013/0104429 | A1* | 5/2013 | Torres | A43C 1/003 36/136 |
| 2015/0059206 | A1* | 3/2015 | Lovett | A43C 3/02 12/142 R |
| 2015/0289594 | A1* | 10/2015 | Rushbrook | A43B 3/34 12/142 T |
| 2015/0289595 | A1* | 10/2015 | Rushbrook | A43B 9/02 36/50.1 |
| 2015/0289596 | A1* | 10/2015 | Beers | A43B 3/26 36/50.1 |
| 2016/0345661 | A1* | 12/2016 | Beers | A43B 3/0031 |
| 2017/0049190 | A1* | 2/2017 | Maussen | A43B 3/26 |
| 2017/0265560 | A1* | 9/2017 | Beers | A43B 3/34 |
| 2017/0265561 | A1* | 9/2017 | Beers | A43C 11/165 |
| 2017/0265571 | A1* | 9/2017 | Beers | A63B 71/08 |
| 2017/0265573 | A1* | 9/2017 | Beers | A43C 11/008 |
| 2017/0265574 | A1* | 9/2017 | Beers | A43C 11/008 |
| 2017/0265575 | A1* | 9/2017 | Beers | A43C 3/00 |
| 2017/0265576 | A1* | 9/2017 | Beers | A43C 11/16 |
| 2017/0265577 | A1* | 9/2017 | Schneider | A43C 1/00 |
| 2017/0265579 | A1* | 9/2017 | Schneider | A43B 3/34 |
| 2017/0265580 | A1* | 9/2017 | Schneider | A43C 11/165 |
| 2017/0265581 | A1* | 9/2017 | Chang | A43B 3/34 |
| 2017/0265582 | A1* | 9/2017 | Walker | A43B 3/36 |
| 2017/0265585 | A1* | 9/2017 | Grand | B65H 75/4486 |
| 2017/0265586 | A1* | 9/2017 | Schneider | A43B 3/34 |
| 2017/0265591 | A1* | 9/2017 | Schneider | A43C 11/165 |
| 2017/0272008 | A1* | 9/2017 | Schneider | A43C 11/008 |
| 2017/0318908 | A1* | 11/2017 | Wyatt | A43C 11/008 |
| 2018/0110288 | A1* | 4/2018 | Hatfield | A43B 11/02 |
| 2018/0110294 | A1* | 4/2018 | Schneider | A43B 3/34 |
| 2018/0110298 | A1* | 4/2018 | Schneider | A43B 3/34 |
| 2018/0125168 | A1* | 5/2018 | Beers | A43C 1/00 |
| 2018/0153263 | A1* | 6/2018 | Beers | A43C 7/08 |
| 2018/0199671 | A1* | 7/2018 | Schneider | A43C 7/06 |
| 2018/0199673 | A1* | 7/2018 | Schneider | A43C 7/06 |
| 2018/0199674 | A1* | 7/2018 | Walker | A43B 3/0031 |
| 2018/0343977 | A1* | 12/2018 | Riccomini | F16H 1/2863 |
| 2019/0098963 | A1* | 4/2019 | Beers | A43C 11/008 |
| 2019/0246745 | A1* | 8/2019 | Bock | A43B 3/36 |
| 2019/0246747 | A1 | 8/2019 | Bock et al. | |

FOREIGN PATENT DOCUMENTS

| | | |
|---|---|---|
| CN | 111836562 | 10/2020 |
| CN | 111836562 B | 12/2021 |
| CN | 114145532 A | 3/2022 |
| DE | 3900777 | 7/1990 |
| EP | 1440627 | 7/2004 |
| EP | 3182254 | 6/2017 |
| EP | 3703524 | 11/2022 |
| JP | 410316316 | 12/1998 |
| JP | 2021510602 | 4/2021 |
| JP | 7027568 B2 | 2/2022 |
| JP | 2022101527 A | 7/2022 |
| KR | 100807105 | 2/2008 |
| KR | 20210068633 | 6/2021 |
| KR | 102467400 | 11/2022 |
| KR | 20220154852 | 11/2022 |
| WO | 2017185160 | 11/2017 |
| WO | 2020047488 | 3/2020 |

OTHER PUBLICATIONS

"International Application Serial No. PCT US2019 049179, International Search Report dated Dec. 20, 2019", 3 pgs.

"International Application Serial No. PCT US2019 049179, Written Opinion dated Dec. 20, 2019", 4 pgs.

"Chinese Application Serial No. 201921459659.8, Office Action dated Mar. 31, 2020", w o English translation, 2 pgs.

"Chinese Application Serial No. 201921459659.8, Response filed May 29, 2020 to Office Action dated Mar. 31, 2020", w English claims, 60 pgs.

"Chinese Application Serial No. 201980010668.5, Response Filed Aug. 17, 2021 to Office Action dated Feb. 2, 2021", With English claims, 11 pages.

"European Application Serial No. 19854504.8, Response filed Aug. 17, 2021 to Extended European Search Report dated Feb. 10, 2021", 3 pgs.

"European Application Serial No. 19854504.8, Communication Pursuant to Article 94(3) EPC dated Sep. 8, 2021", 4 pgs.

"Japanese Application Serial No. 2020-552359, Response filed Oct. 26, 2021 to Notification of Reasons for Rejection dated Apr. 27, 2021", w English claims, 9 pgs.

"Chinese Application Serial No. 201980010668.5, Office Action dated Feb. 2, 2021", w English Translation of search report, 5 pgs.

"International Application Serial No. PCT US2019 049179, International Preliminary Report on Patentability dated Mar. 11, 2021", 6 pgs.

"European Application Serial No. 19854504.8, Extended European Search Report dated Feb. 10, 2021", 5 pgs.

"European Application Serial No. 19854504.8, Response filed Jan. 4, 2022 to Communication Pursuant to Article 94(3) EPC dated Sep. 8, 2021", 25 pqs.

"Chinese Application Serial No. 202111345758.5, Voluntary Amendment filed Jun. 29, 2022", w/English claims, 17 pgs.

"Korean Application Serial No. 10-2021-7017060, Voluntary Amendment filed Jul. 20, 2022", w/English claims, 14 pgs.

"European Application Serial No. 22204908.2, Extended European Search Report dated Mar. 24, 2023", 9 pgs.

\* cited by examiner

AUTOLACING FOOTWEAR

PRIORITY APPLICATIONS

This application claims the benefits of priority to U.S. Provisional Patent Application No. 62/855,635, filed May 31, 2019, and U.S. Provisional Provisional Patent Application No. 62/725,733, filed Aug. 31, 2018, the contents of both which are incorporated herein by reference in their entireties.

TECHNICAL FIELD

The subject matter disclosed herein generally relates to an article of footwear having an autolacing motor.

BRIEF DESCRIPTION OF THE DRAWINGS

Some embodiments are illustrated by way of example and not limitation in the figures of the accompanying drawings.

DETAILED DESCRIPTION

Figure 1:
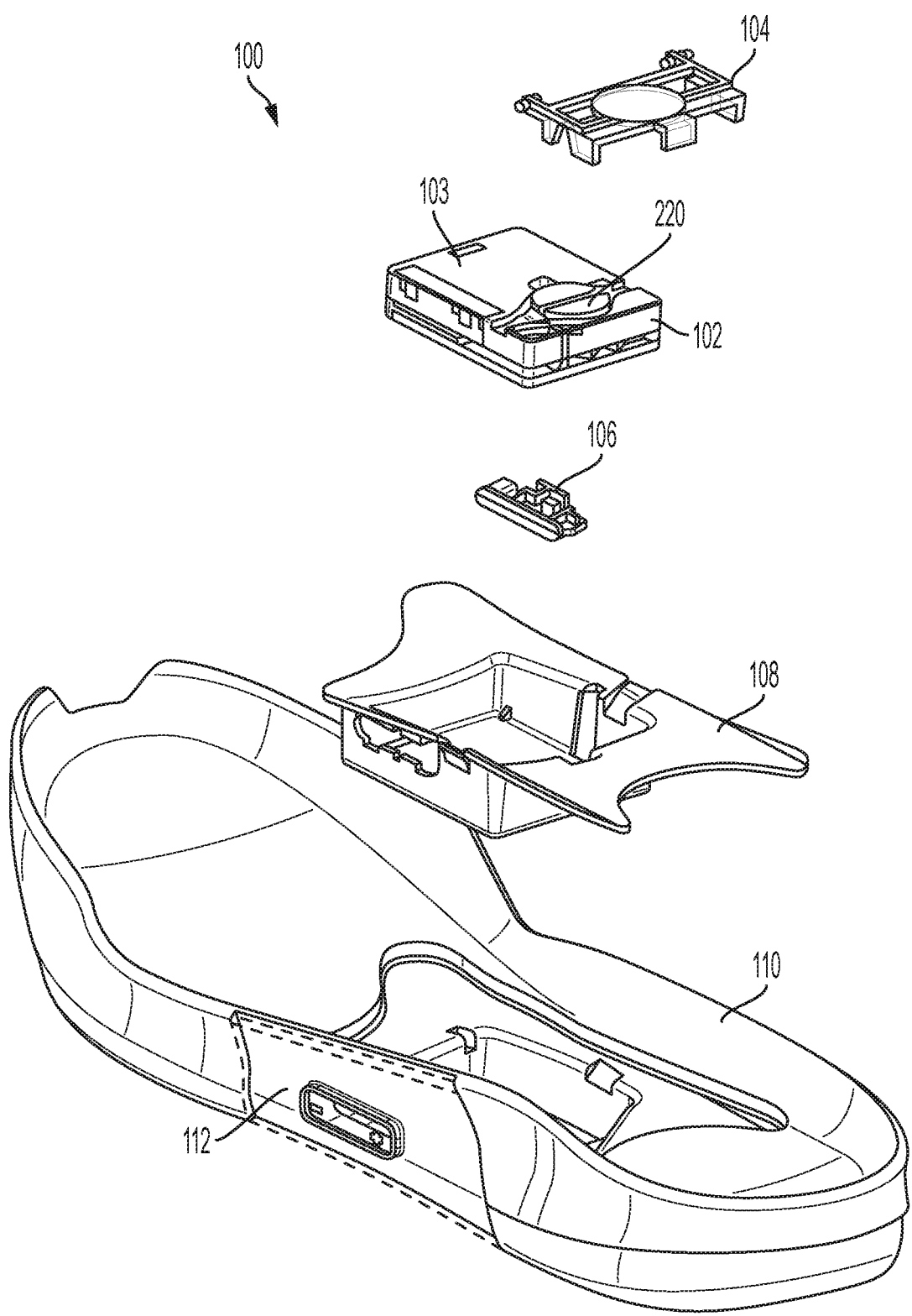
FIG. 1 is an exploded view illustration of components of a motorized lacing system for an article of footwear, in an example embodiment.

Example methods and systems are directed to an article of footwear having an autolacing motor. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Articles of footwear, such as shoes, may include a variety of components, both conventional and unconventional. Conventional components may include an upper, a sole, and laces or other securing mechanisms to enclose and secure the foot of a wearer within the article of footwear. Unconventionally, a motorized lacing system may engage with the lace to tighten and/or loosen the lace. Additional or alternative electronics may provide a variety of functionality for the article of footwear, including operating and driving the motor, sensing information about the nature of the article of footwear, providing lighted displays and/or other sensory stimuli, and so forth.

In general, and particularly for articles of footwear oriented toward the performance of athletic activities, characteristics such as the size, form, robustness, and weight of the article of footwear may be of particular importance. Where the components of the article of footwear promote, for instance, a relatively tall, heavy, and/or fragile article of footwear, the capacity of the article of footwear to be effective in the performance of the athletic activity may be compromised.

Components of an autolacing system may be included in a housing and positioned on or within the article of footwear, e.g., within a sole structure. However, electronic components may be susceptible to otherwise ordinary forces on an article of footwear. For instance, if a wearer steps on a rock or other hard protrusion, force may be imparted through the sole to the housing, which may flex and impart force on the components contained within. Certain components may be relatively more mechanically robust than others. Thus, if the force is imparted on the battery or on the motor, for instance, then the risk of damage to the system may be less than if the force is imparted on a printed circuit board (PCB) or electronic connector.

However, design considerations related to height and ease of manufacture may make it desirable to place the PCB in a location generally in proximity of a surface of the housing that would typically be oriented closest to the sole. Thus, force on the sole that flexes the housing may result in an undesirable amount of the force being imparted on the PCB. To reduce the force that may tend to be imparted on the PCB, and to direct the force instead to components of the autolacing system which may be relatively more robust than the PCB, one or more supports have been designed in the housing proximate the sole that extend through the PCB and in proximity of another component of the autolacing system, e.g., the motor. When a force is imparted on the housing and the housing flexes, the support contacts the other component and imparts at least some of the force into that component rather than on the PCB. While the supports may not prevent any force from being imparted on the PCB, the supports may direct enough force away from the PCB to limit the force imparted on the PCB to tolerable limits.

FIG. 1 is an exploded view illustration of components of a motorized lacing system for an article of footwear, in an example embodiment. While the system is described with respect to the article of footwear, it is to be recognized and understood that the principles described with respect to the article of footwear apply equally well to any of a variety of wearable articles. The motorized lacing system 100 illustrated in FIG. 1 includes a lacing engine 102 having a housing structure 103, a lid 104, an actuator 106, a mid-sole plate 108, a mid-sole 110, and an outsole 112. FIG. 1 illustrates the basic assembly sequence of components of an automated lacing footwear platform. The motorized lacing system 100 starts with the mid-sole plate 108 being secured within the mid-sole. Next, the actuator 106 is inserted into an opening in the lateral side of the mid-sole plate opposite to interface buttons that can be embedded in the outsole 112. Next, the lacing engine 102 is dropped into a lacing engine cavity of the mid-sole plate 108. In various examples that do not include the mid-sole plate 108, the lacing engine cavity may be included or formed in the mid-sole 110. In an example, the lacing system 100 is inserted under a continuous loop of lacing cable and the lacing cable is aligned with a spool in the lacing engine 102 (discussed below). Finally, the lid 104 is inserted into grooves in the mid-sole plate 108, secured into a closed position, and latched into a recess in the mid-sole plate 108. The lid 104 can capture the lacing engine 102 and can assist in maintaining alignment of a lacing cable during operation.

Figure 2:
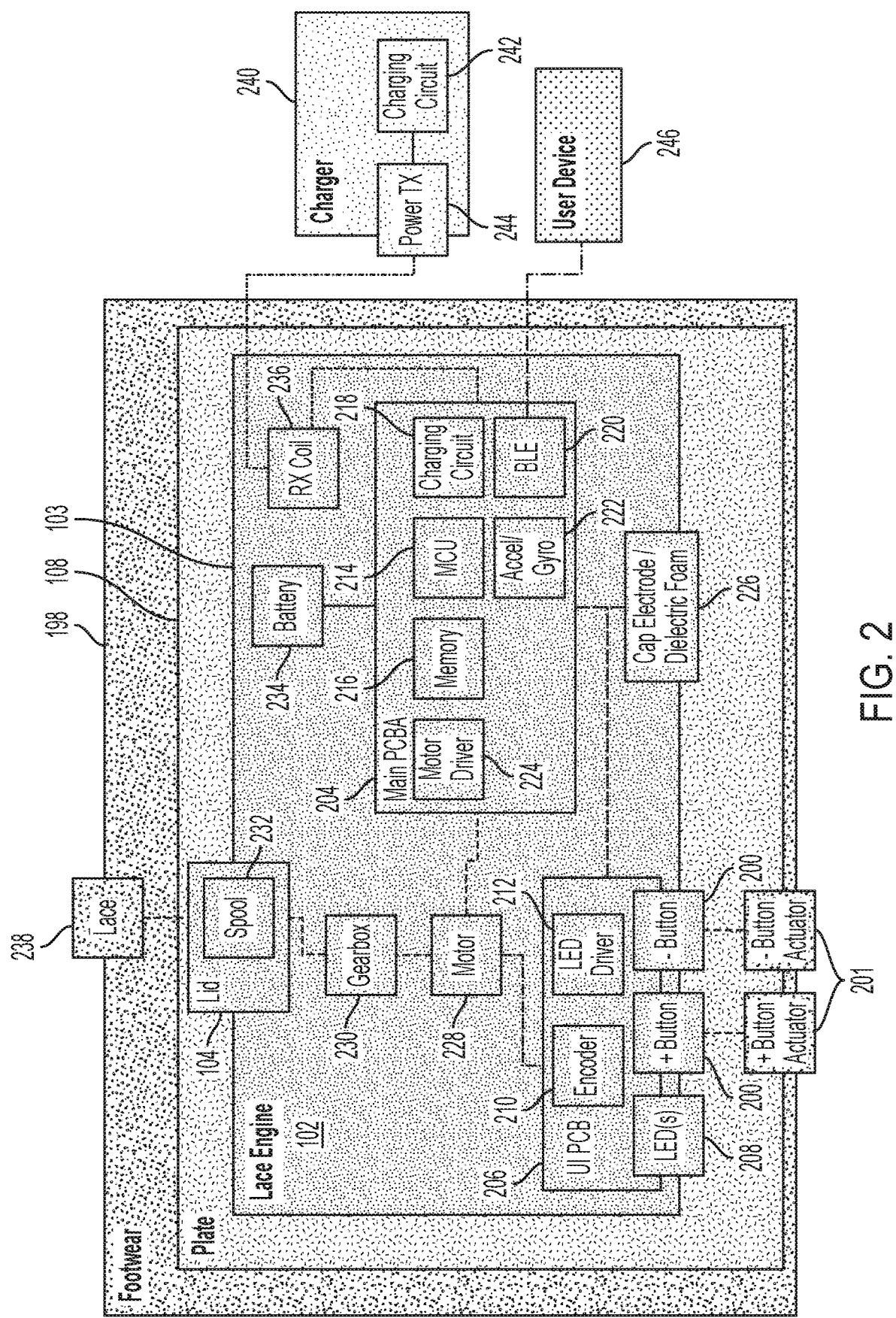
FIG. 2 illustrates generally a block diagram of components of a motorized lacing system, in an example embodiment.

FIG. 2 illustrates generally a block diagram of components of a motorized lacing system 100, in an example embodiment. The system 100 includes some, but not necessarily all, components of a motorized lacing system, including the lacing engine 102, the mid-sole plate 108, and the underlying footwear 198. The system 100 as illustrated includes interface buttons 200, interface button actuators 201, a foot presence sensor 202, and the lacing engine housing 103 enclosing a main PCB 204 and a user interface PCB 206. The user interface PCB 206 includes the buttons 200, one or more light emitting diodes (LEDs) 208 which may illuminate the button actuators 201 or otherwise provide illumination visible outside of the article of footwear, an optical encoder unit 210, and an LED driver 212 which may provide power to the LEDs 208. The main PCB 204 includes a processor circuit 214, an electronic data storage 216, a battery charging circuit 218, a wireless transceiver 220, one or more sensors 222, such as accelerometers, gyroscopes, and the like, and a motor driver 224.

The lacing engine 102 further includes a foot presence sensor 226, such as a capacitive sensor, a motor 228, a transmission 230, a spool 232, a battery or power source 234, and a charging coil 236. The processor circuit 214 is configured with instructions from the electronic data storage 216 to cause motor driver 224 to activate the motor 228 to turn the spool 232 by way of the transmission 230 in order to place a desired amount of tension on a lace 238 wound about the spool 232. The processor circuit 214 may receive inputs from a variety of sources, including the foot presence sensor 226, the sensors 222, and the buttons 200, to decide, according to the instructions, to increase or decrease the tension on the lace 238. For instance, the foot presence sensor 226 may detect the presence of a foot in the footwear 198, and the processor circuit 216 may set the tension to a present tension level. The sensors 222 may detect movement consistent with a particular activity level, e.g., causal walking, a vigorous physical activity, etc., and the processor circuit 214 may cause the tension to be set to a level consistent with that activity level, e.g., relatively loose for casual walking and relatively tight for vigorous physical activity. A user may press the button actuators 201 to manually command an incremental or linear increase or decrease in tension as desired.

The battery 234 provides power for the components of the lacing engine 102 in general and is, in the example embodiment, a rechargeable battery. However, alternative power sources, such as non-rechargeable batteries, super capacitors, and the like, are also contemplated. In the illustrated example, the battery 234 is coupled to the charging circuit 218 and the recharge coil 236. When the recharge coil 236 is placed in proximity of an external charger 240, a charging circuit 242 may energize a transmit coil 244 to inductively induce a current in the recharge coil 236, which is then utilized by the charging circuit 218 to recharge the battery 234. Alternative recharging mechanisms are contemplated, such as a piezoelectric generator located within the footwear 198.

The wireless transceiver 220 is configured to communicate wirelessly with a remote user device 246, such as a smartphone, wearable device, tablet computer, personal computer, and the like. In example, the wireless transceiver 220 is configured to communicate according to the Bluetooth Low Energy modality, though the wireless transceiver 220 may communicate according to any suitable wireless modality, including near field communication (NFC), 802.11 WiFi, and the like. Moreover, the wireless transceiver 220 may be configured to communicate with multiple external user devices 246 and/or according to multiple different wireless modalities. The wireless transceiver 220 may receive instructions from the user device 246, e.g., using an application operating on the user device 246, for controlling the lacing engine 102, including to enter predetermined modes of operation or to incrementally or linearly increase or decrease the tension on the lace 238. The wireless transceiver 220 may further transmit information about the lace engine 102 to the user device 246, e.g., an amount of tension on the lace 238 or otherwise an orientation of the spool 232, an amount of charge remaining on the battery 234, and any other desired information about the lacing engine 102 generally.

Figure 3A:
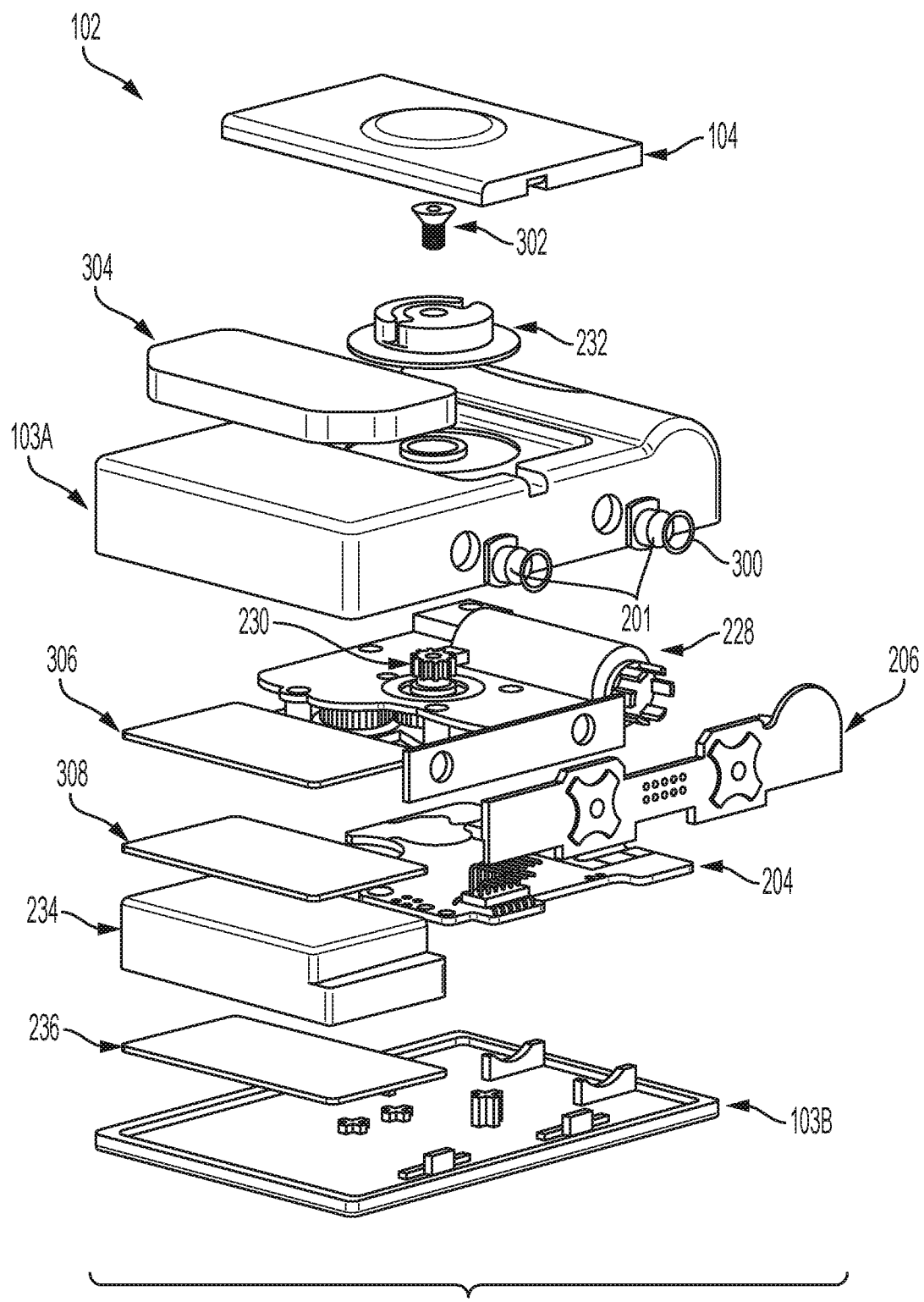
FIG. 3A is an exploded view of the lacing engine, in an example embodiment.

FIG. 3A is an exploded view of the lacing engine 102, in an example embodiment. The lacing engine 102 includes the housing 103, which includes an upper portion 103A and a lower portion 103B, which enclose the lacing engine 102 generally, except for certain components which are exterior of the housing 103. Those components include the button actuators 201 (and related O-rings 300 for protecting the lacing engine 102 against environmental conditions, such as moisture), the spool 232, which is secured to the transmission 230 via a setscrew 302 and which is enclosed with the lid 104, and a dielectric foam 304 of the foot presence sensor 226. Enclosed within the housing 103 is the main PCB 204, the user interface PCB 206, the motor 228, the transmission 230, the battery 234, the recharge coil 236, and an electrode 306 and foam 308 of the foot presence sensor 226.

Partially visible in the exploded view is the optical encoder unit 210. Specifically, a three-dimensional encoder 310 of the optical encoder unit 210 is coupled to the motor 228 and turns with the turning of the motor. Specific implementations of the three-dimensional encoder 310 are illustrated herein.

Figure 3B:
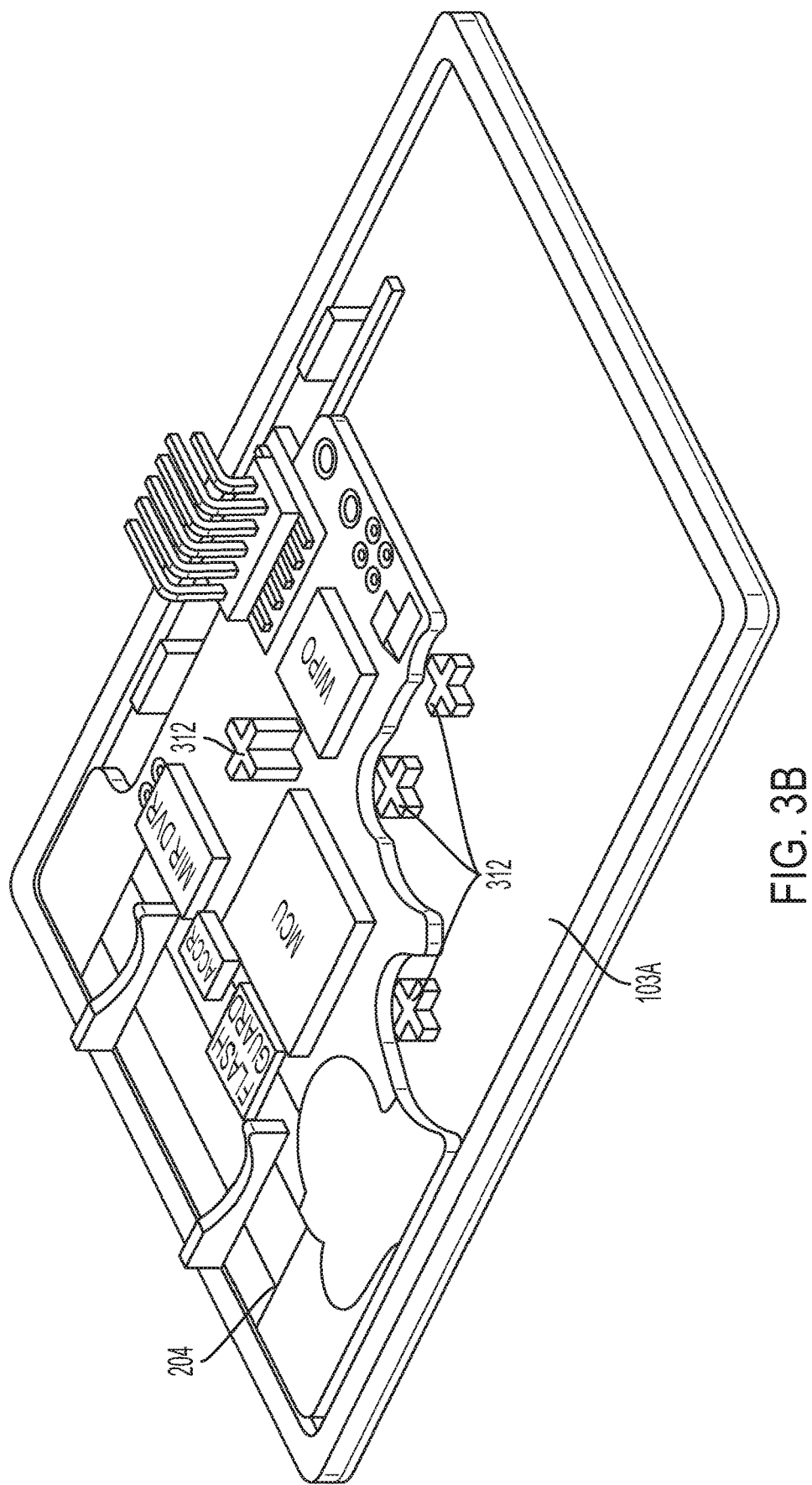
FIG. 3B is a view of the lower portion of the housing in relation to the main PCB.

FIG. 3B is a view of the lower portion 103B of the housing 103 in relation to the main PCB 204. Included in the lower portion 103B are posts 312 extending from in interior surface 314 of the lower portion 103B of the housing 103. As will be illustrated herein, at least one of the posts 312 extend through a hole in the main PCB 204 (not visible). When an external force is placed on the exterior of the lower portion 103B of the housing 103, e.g., because a wearer of the footwear 198 steps on an object that imparts force through the mid-sole 110 and plate 108 (FIG. 1), the lower portion 103B may flex. The posts 312 are positioned such that the flexing of the lower portion 103B may result in one or more of the posts 312 contacting a relatively more solid or resilient component of the lacing engine 102, e.g., the motor 228, the transmission 230, or the battery 234, rather than the a relatively less resilient component, such as the main PCB 204.

Figure 4A:
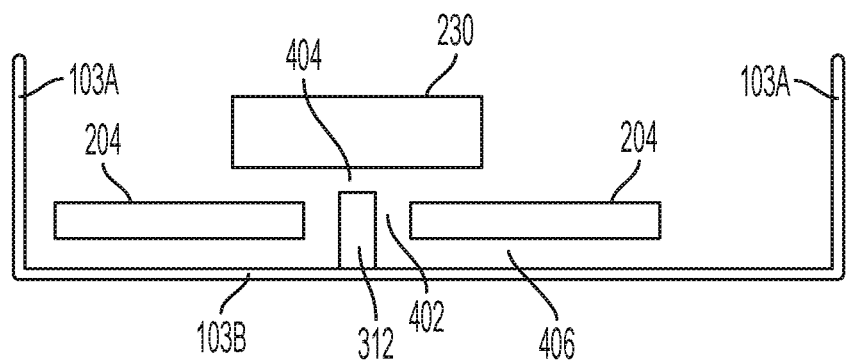
FIGS. 4A and 4B are sequential block diagrams illustrating the function of a post when a force is imparted on the lower portion, in an example embodiment.
Figure 4B:
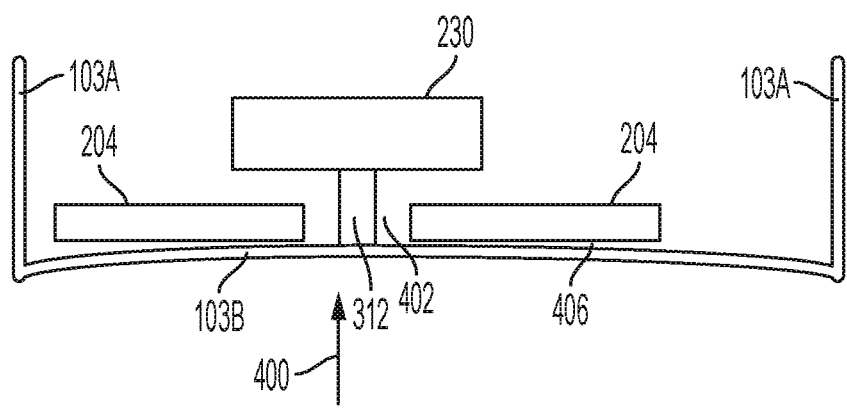

FIGS. 4A and 4B are sequential block diagrams illustrating the function of a post 312 when a force 400 is imparted on the lower portion 103B, in an example embodiment. The block diagram has been simplified and exaggerated for the purposes of illustration. It is to be recognized that multiple posts 312 may be implemented according to the principles illustrated herein across a variety of locations, as illustrated in FIG. 3B, and that the posts 312 may be positioned and configured to contact any suitable resilient component, as noted herein.

FIG. 4A shows the lower portion 103B coupled to the upper portion 103A with a post 312 projecting from the interior surface 314 of the lower portion 103B. The post 312 extends through a hole 402 formed in the main PCB 204. As illustrated, the post does not contact the transmission 230 but rather has a gap 404 therebetween. In various examples, the gap 404 is less than a gap 406 between the main PCB 204 and the interior surface 314. However, it is to be recognized that there may not be a gap 404 or that the gap 404 may be approximately the same as the gap 406. As no force has been imparted on the lower portion 103B, the lower portion 103B is substantially flat and linear.

FIG. 4B shows the lower portion 103B bowed on account of the force 400 imparted on the lower portion 103B. The bowing of the lower portion 103B has caused the post 312 to contact the transmission 230, transferring at least some of the force 400 to the transmission 230. While the gap 404 between the post 312 and the transmission 230 has been eliminated, at least some gap 406 remains between the interior surface 314 and the main PCB 204. As a result, in this example, no portion of the force 400 is imparted on the relatively fragile main PCB 204 and is instead imparted on the the more resilient transmission 230.

It is to be recognized and understood that while the exaggerated illustration shows no contact between the lower portion 103B and the main PCB 204, actual implementations may nonetheless result in some contact between the lower portion 103B and the main PCB 204, and/or that at least some of the force 400 is imparted on the main PCB 204. However, at minimum, the presence of the post 312 may tend to cause at least some of the force 400 to be imparted on the transmission 230 rather than on to the main PCB 204. A relative reduction in the amount of force 400 imparted on the main PCB 204 than would be the case without the post 312 may still reduce a likelihood of the main PCB 204 being damage from imparted force 400 on the lower portion 103B.

Figure 5A:
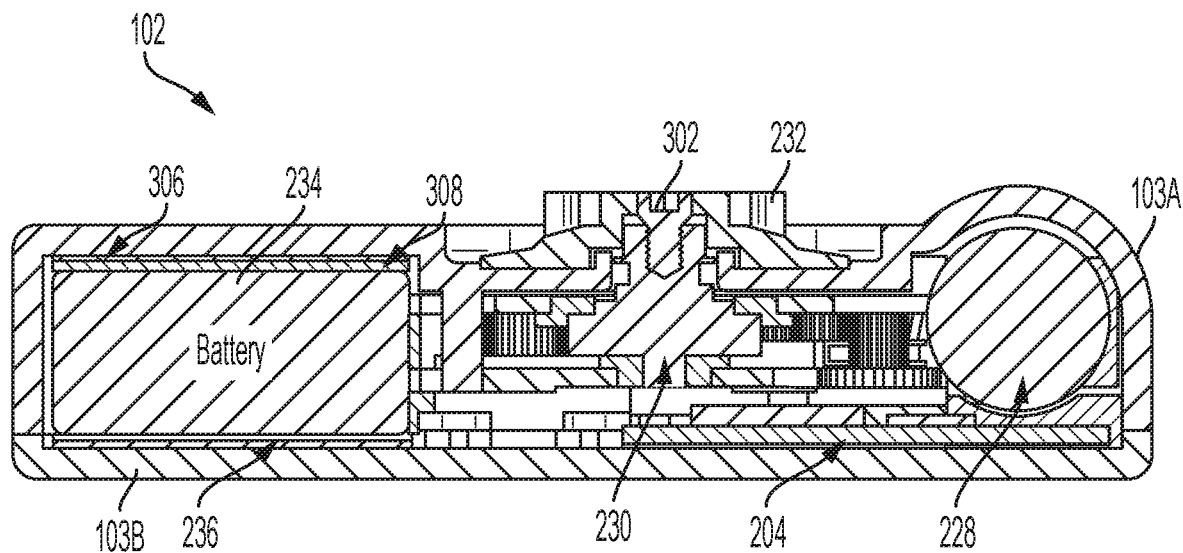
FIGS. 5A and 5B are side and perspective views of the lace engine, in an example embodiment.
Figure 5B:
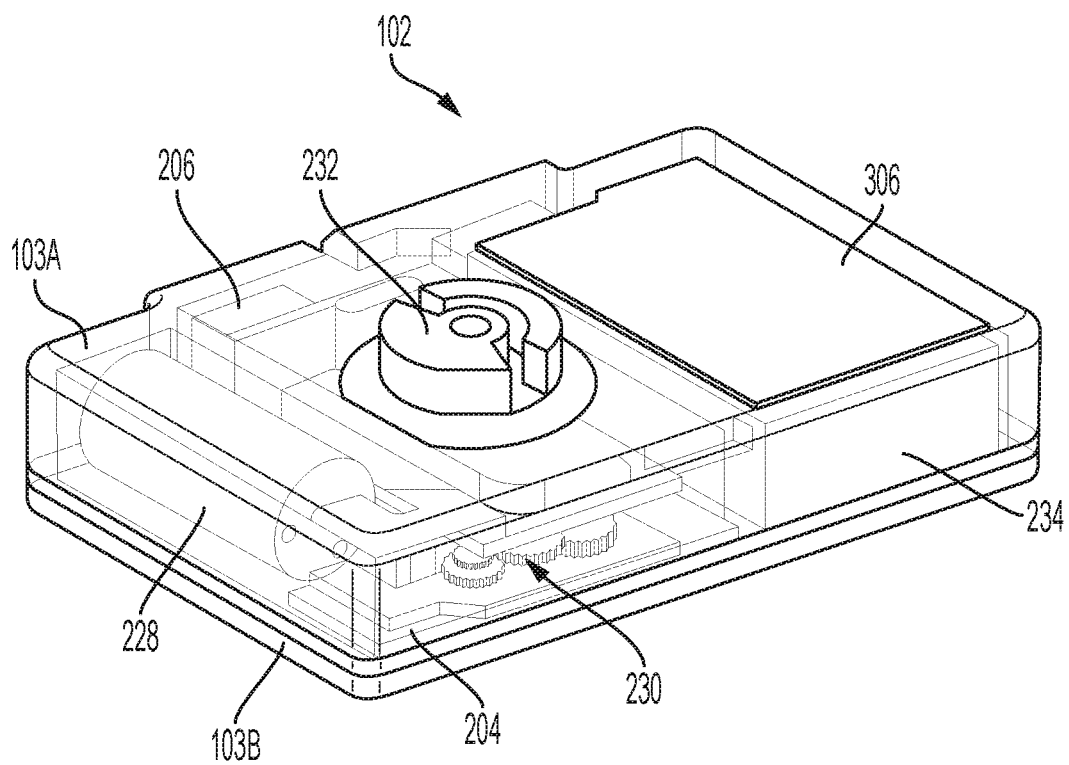

FIGS. 5A and 5B are side and perspective views of the lace engine 102, in an example embodiment. Components such as the main PCB 204, user interface PCB 206, motor 228, transmission 230, battery 234, electrode 306, foam 308, and recharge coil 236 are contained within the top portion 103A and bottom portion 103B of the housing 103. The spool 232 is secured to the transmission 230 via the set screw 302. The top portion 103A generally conforms to a curved contour of the motor 228.

In an example, the top portion 103A and bottom portion 103B are each approximately 1.5 millimeters thick. The recharge coil 236 is approximately 0.7 millimeters thick, including a ferrite backing. The battery 234 is approximately 7.5 millimeters thick, accounting for a swelling of the battery 234 over time. In an example, the electrode 306 is approximately 0.25 millimeters thick and the foam 308 is approximately 0.5 millimeters thick, providing for a total thickness of the lace engine 102 proximate the battery 234 of approximately 11.75 millimeters. In an example, the motor 228 is approximately 8.5 millimeters thick and the lace engine 102 proximate the motor 228 has a maximum thickness of approximately 14.55 millimeters. In an example, the lace engine 102 proximate the spool 232 has a thickens of approximately 14.7 millimeters.

Figure 6:
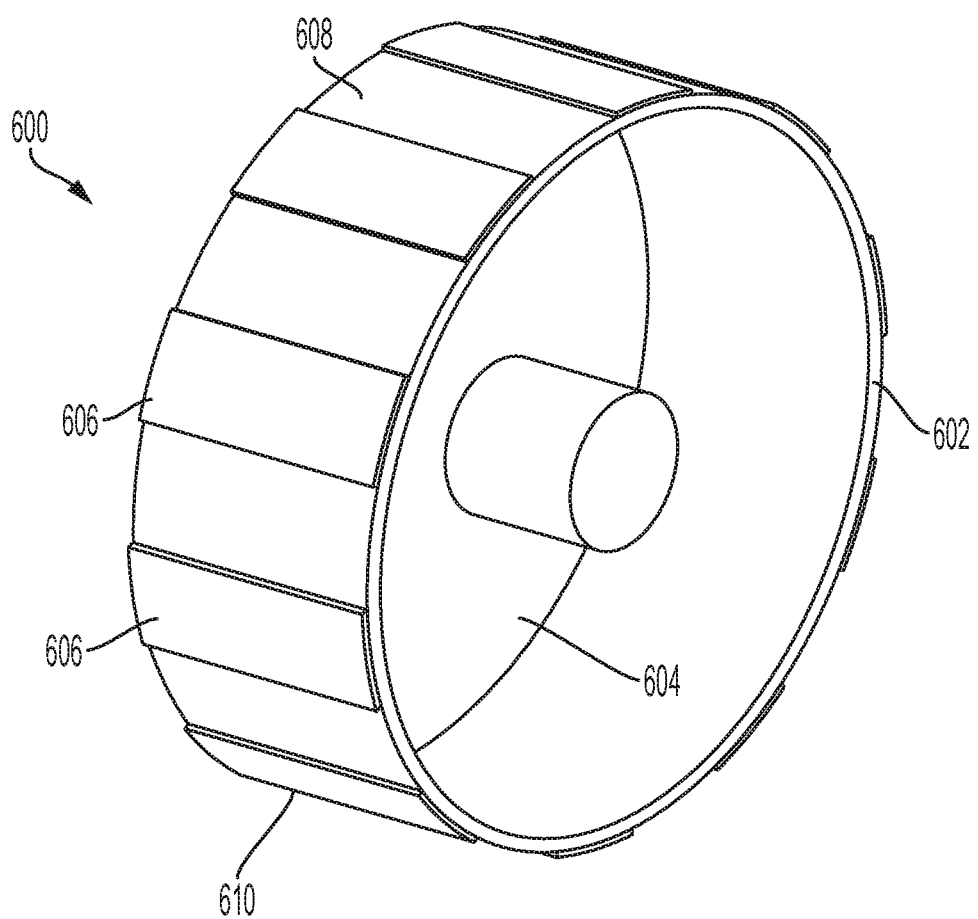
FIG. 6 is a depiction of a three-dimensional encoder, in an example embodiment.

FIG. 6 is a depiction of a three-dimensional encoder 600, in an example embodiment. The three-dimensional encoder 600 may function as the three-dimensional encoder 310 in the optical encoder unit 210. The three-dimensional encoder 600 is a drum encoder, including a drum portion 602 and a securing portion 604 coupled to the cylindrical portion and configured to secure the three-dimensional encoder 600 to e.g., a motor shaft. The securing portion may be solid or may be individual portions that extend between the drum portion 602 and the motor, e.g., spokes or the like.

As illustrated, the drum portion 602 is cylindrical and has a circular cross section, though any of a variety of suitable geometries are contemplated, including conical, octagonal, and the like. As with the two-dimensional disk 300, the drum 600 includes a first plurality of segments 606, e.g., dark segments, alternatingly positioned between a second plurality of segments 608, e.g., reflective segments. The first and second plurality of segments 606, 608 are positioned on an exterior surface 610 of the drum portion 602.

Figure 7:
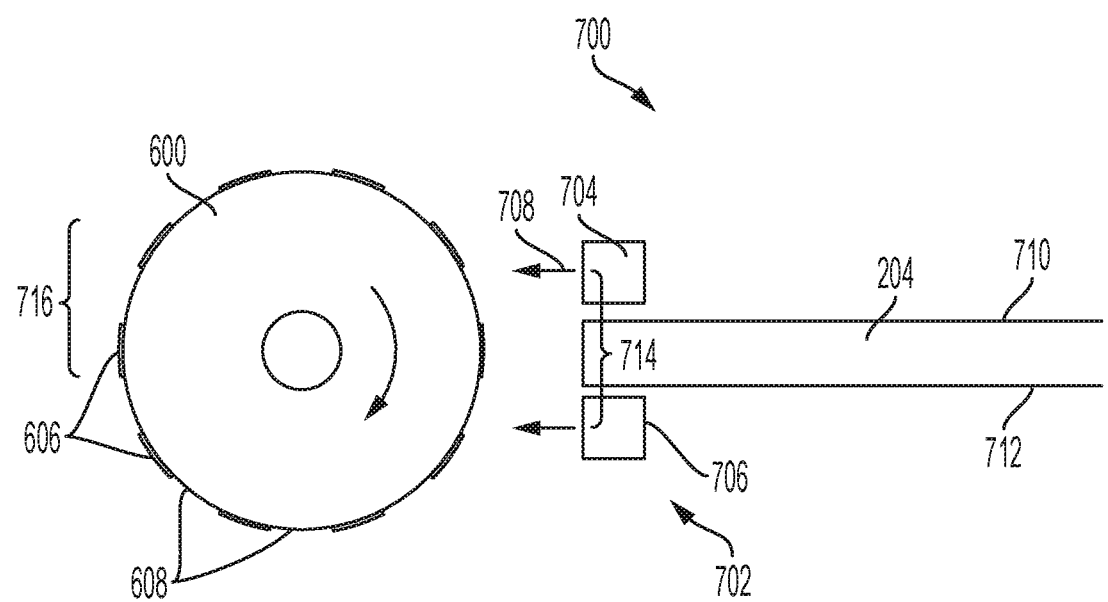
FIG. 7 is a depiction of an optical encoder, including the three-dimensional encoder, in an example embodiment.

FIG. 7 is a depiction of an optical encoder unit 700, including the three-dimensional encoder 600, in an example embodiment. The optical encoder 700 may operate as the optical encoder 210 in the block diagram of FIG. 2. In addition to the three-dimensional encoder 600, the optical encoder 700 includes an optical sensor 702, including a first optical sensor 704 and a second optical sensor 706 each within an optical range 708 of the three-dimensional encoder 600, the optical range 708 being a distance over which the first and second optical sensors 704, 706 can differentiate between the first and second plurality of segments 606, 608. As such, the optical range 708 will be different between and among different types of first and second optical sensors 704, 706. In the event that external design requirements may necessitate a specific distance between the optical sensor 702 and the three-dimensional encoder 600, first and second optical sensors 704, 706 may be selected that have an optical range 708 at least as long as the distance.

The first optical sensor 704 is positioned on a first major surface 710 of the main PCB 204 while the second optical sensor 708 is positioned on a second major surface 712 of the main PCB 204. In the illustrated example, the first and second optical sensors 704, 706 have a vertical spacing 714 approximately equal to a height 716 of each individual one of the first and second plurality of segments 606, 608, e.g., within approximately five (5) percent of the height 716. As such, each of the first and second optical sensors 704, 706 will both tend to detect the same type of segment, i.e., will both detect dark segments or reflective segments. If each of the first and second optical sensors 704, 706 do not detect the same type of segment, e.g., the first optical sensor 704 detects one of the first plurality of segments 606 and the second optical sensor 706 detects one of the second plurality of segments 608 (or vice versa), the inconsistency may be expected to be resolved soon in favor of both the first and second optical sensor 704, 706 detecting the same type of segment 606, 608.

While a particular configuration of the optical sensor 702 is illustrated, it noted and emphasized that the number and orientation of optical sensors may be varied between and among different implementations. Thus, in an example an alternative example of the optical sensor 702 may have only one individual optical sensor, while a further alternative example of the optical sensor 702 may include three or more individual optical sensors. However, in various examples, each optical sensor is positioned on one of the major surfaces 710, 712 of the main PCB 204.

Figure 8A:
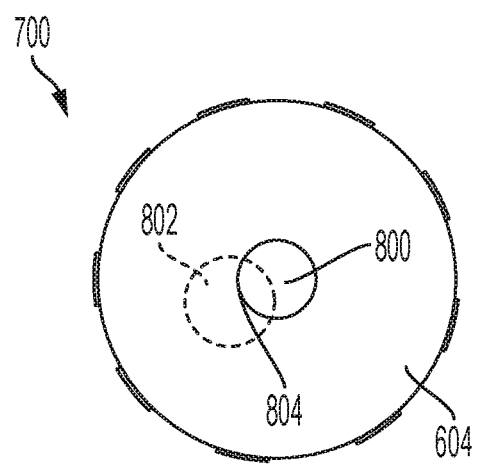
FIGS. 8A-8C illustrate the operation of an optical encoder which is off center relative to a major axis of the optical encoder, in an example embodiment.
Figure 8B:
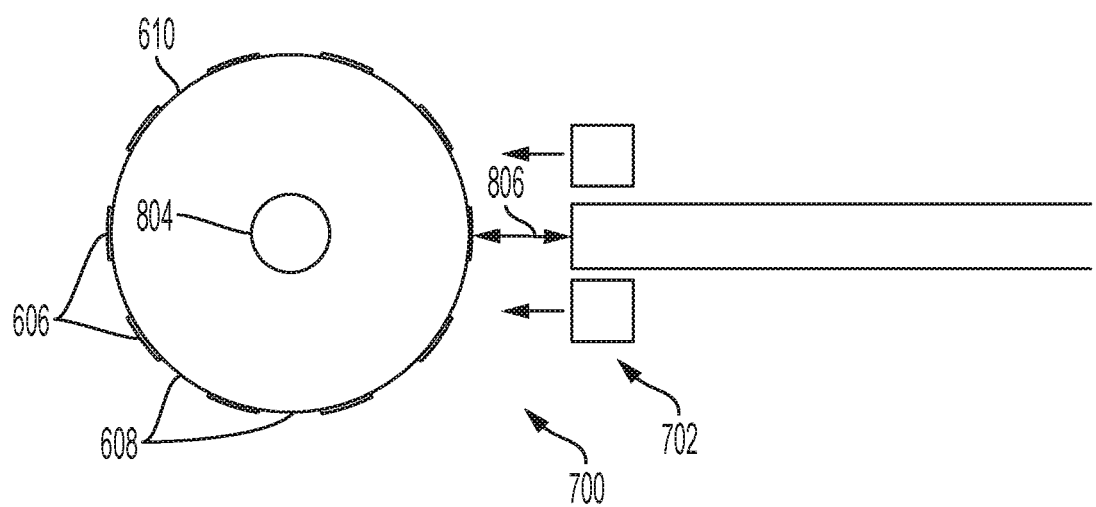
Figure 8C:
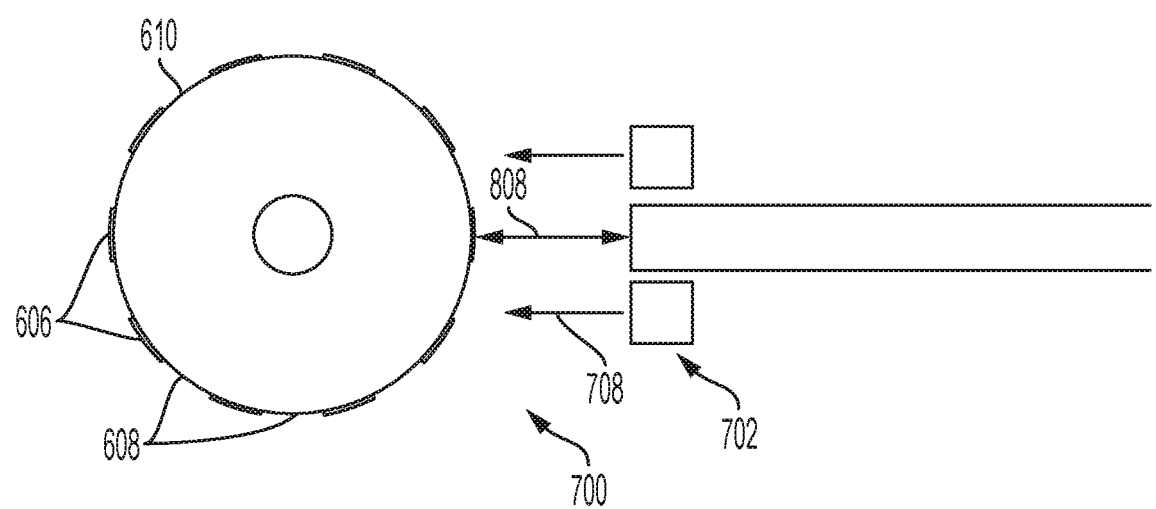

FIGS. 8A-8C illustrate the operation of an optical encoder unit 700 which is off center relative to a major axis 800 of the optical encoder 700, in an example embodiment. In FIG. 8A, a center 802 of an aperture 804 in the securing section 604 through which the motor shaft 306 may pass is offset by distance relative to the major axis 800. In FIG. 8B, with the aperture 804 fixed about the shaft, the exterior surface 610 and, by extension, the first and second plurality of segments 606, 608, come to within a first distance 806 of the optical sensor 702. In FIG. 8C, the optical encoder 700 having completed a half-rotation relative to in FIG. 8B, the exterior surface 610 comes to within a second distance 808 of the optical sensor 702, the second distance 808 being greater than the first distance 806, owing to the off-center aperture 804 being fixed about the motor shaft.

Offsets between the major axis 800 and the center 802 of the aperture may be an unintended consequence of a manufacture process. However, because of the properties of the optical sensor 700, the apparent height 716 (FIG. 7) of each of the first and second plurality of segments 606, 608 may remain the same. As a result, such concentricity issues may merely result in a difference in focal distance of the optical sensor 702. Differences in the focal distance may be resolved by the optical sensor 702 within the optical range 708 of the optical sensor 702. As such, the optical encoder 700 may allow for greater variance in a manufacturing process than may be allowed in a manufacturing process of the optical encoder 300, as well as be more robust to normal wear and tear during use.

Figure 9:
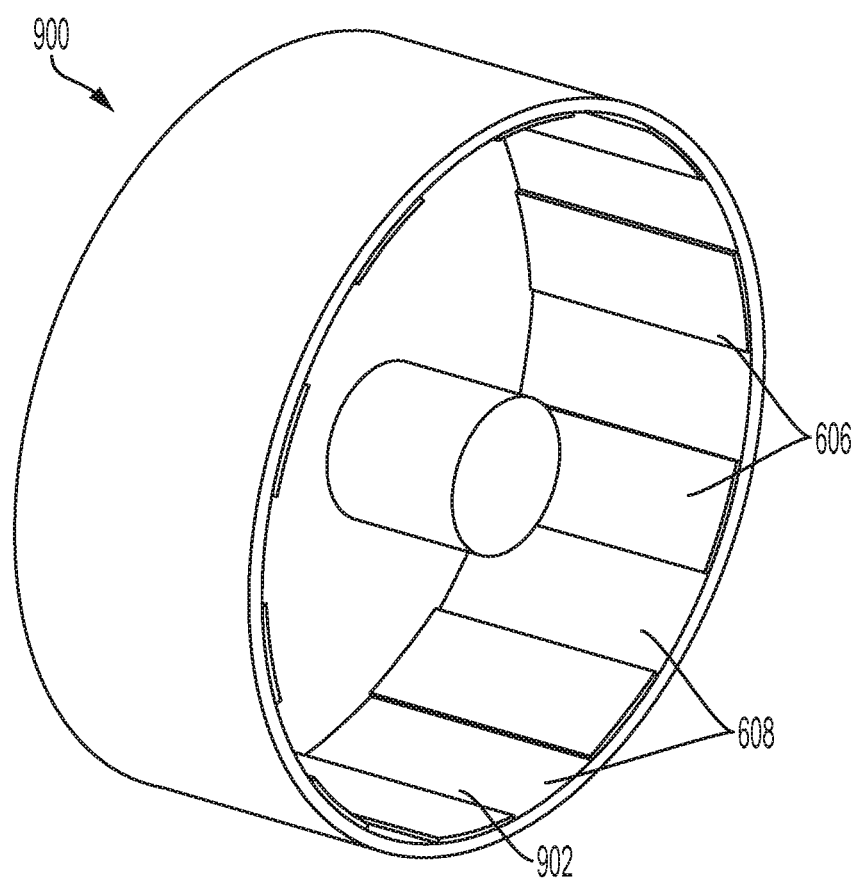
FIG. 9 is a depiction of an alternative example of a three-dimensional encoder, in an example embodiment.

FIG. 9 is a depiction of an alternative example of a three-dimensional encoder 900, in an example embodiment. The three-dimensional encoder 900 may otherwise have the same properties as the three-dimensional encoder 600. But rather than having the first and second plurality of segments 606, 608 on an outside surface of the drum portion 602, the three-dimensional encoder 900 includes the first and second plurality of segments 606, 608 on an interior surface 902. The three-dimensional encoder 900 may otherwise be utilized in an arrangement similar to that of the optical sensor 700, with the optical sensors 702 positioned to sense the interior surface 902.

Figure 10A:
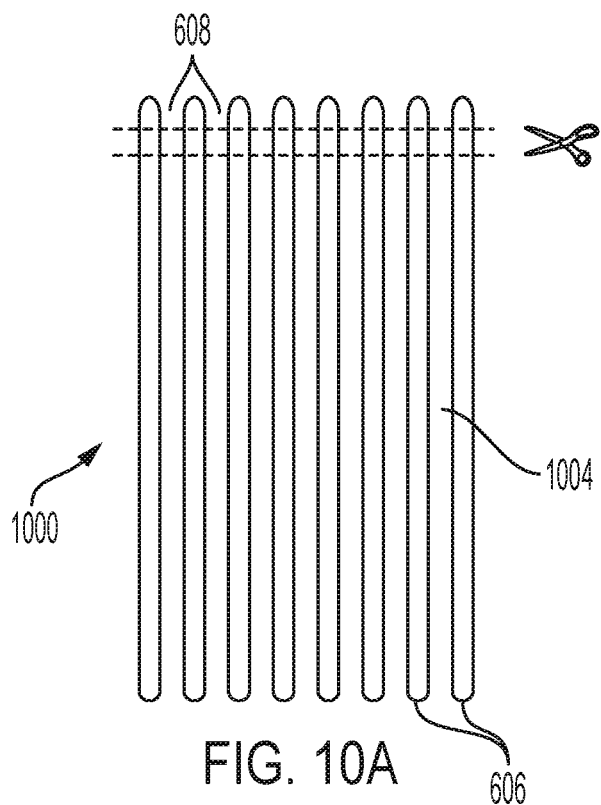
FIGS. 10A-10C illustrate a manufacturing process for the three-dimensional encoders, in an example embodiment.
Figure 10B:
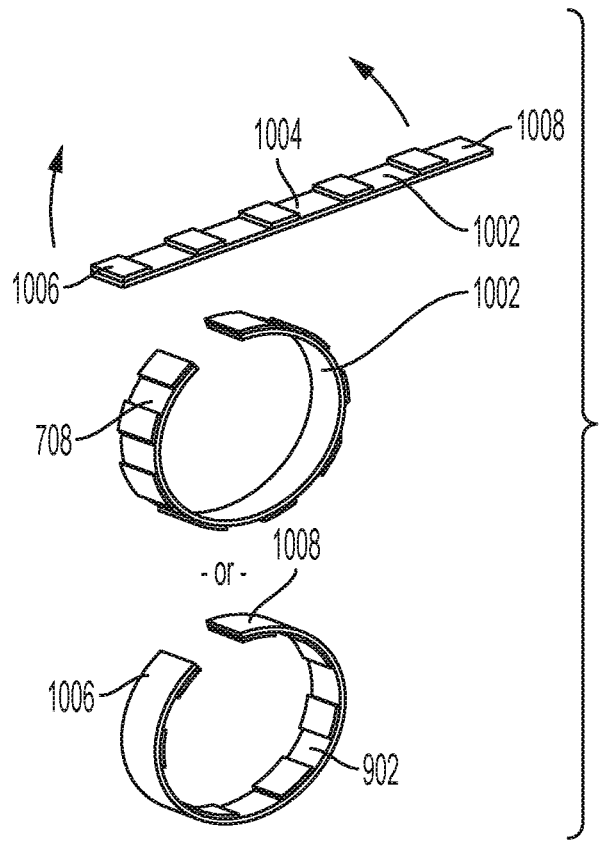
Figure 10C:
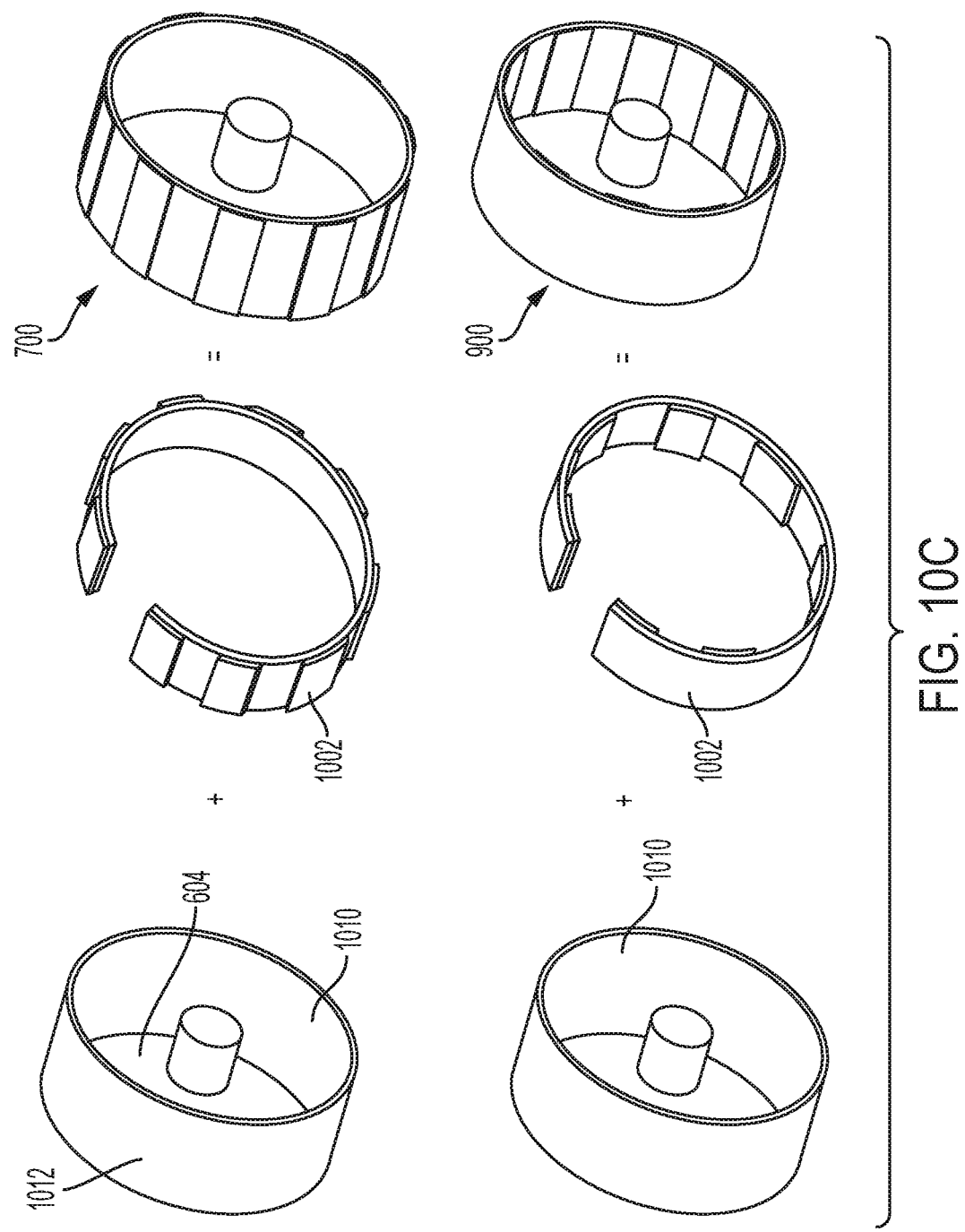

FIGS. 10A-10C illustrate a manufacturing process for the three-dimensional encoders 700, 900, in an example embodiment.

In FIG. 10A, a sheet 1000 of elongate first and second plurality of segments 606, 608 is cut into individual strips 1002. The sheet 1000 is made of any suitable material, such as Mylar, and the dark segments, e.g., the first plurality of segments 606, are printed onto a major surface 1004 of sheet 1000. The reflective segments, e.g., the second plurality of segments 608, are untreated or substantially untreated Mylar.

In FIG. 10B, the strip 1002 is folded so that the major surface 1004, i.e., the printed side, is either on an exterior surface 708 or an interior surface 902, as desired. A first end 1006 is secured to a second end 1008 to make a loop.

In FIG. 10C, the strip 1002 is coupled to a frame 1010 to form the three-dimensional encoder 700, 900, as desired. The frame 1010 includes the securing portion 604 and a drum 1012 on which to fix the strip 1002 to form the drum portion 602.

Figure 11:
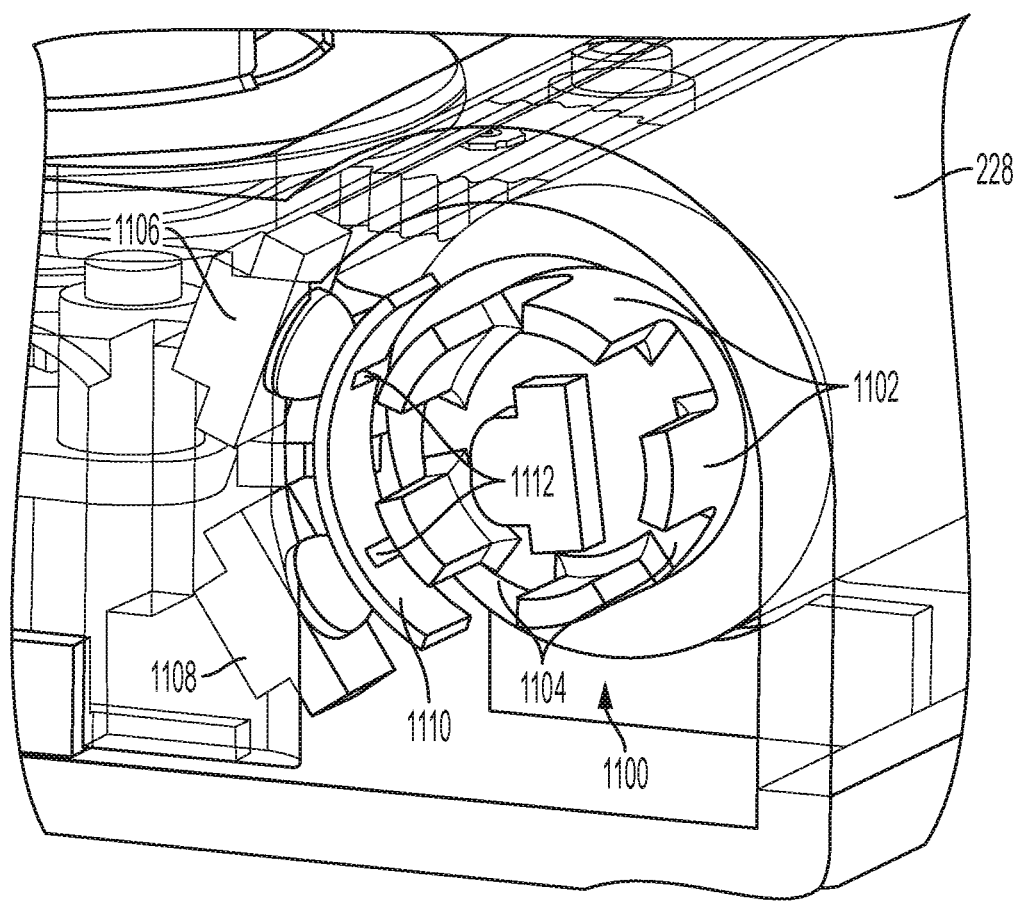
FIG. 11 is an illustration of a three-dimensional encoder, in an example embodiment.
Figure 12A:
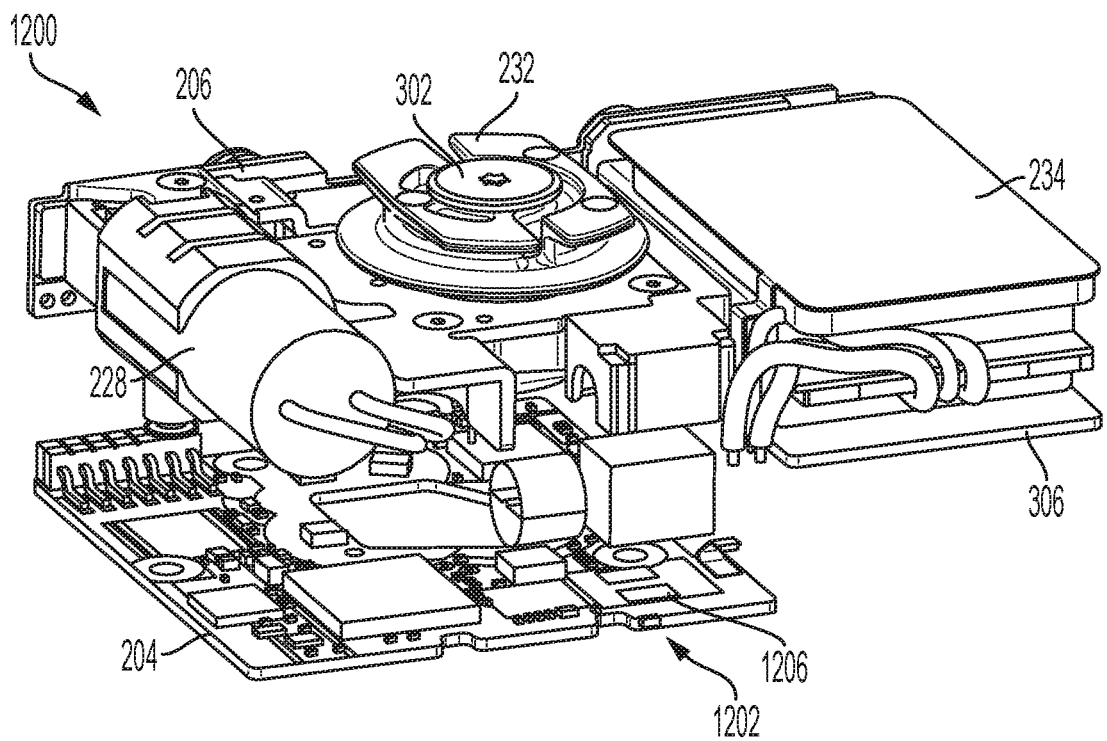
FIGS. 12A-12D are perspective views of a lacing engine, in an example embodiment.
Figure 12B:
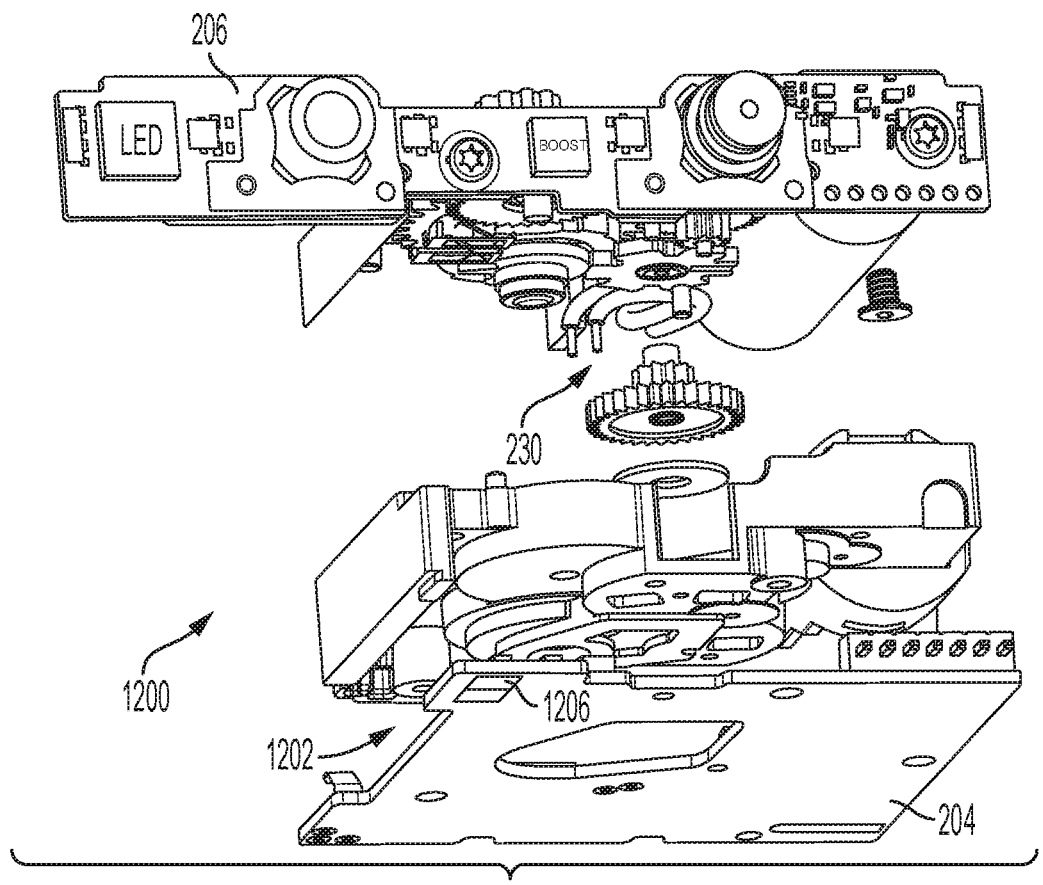
Figure 12C:
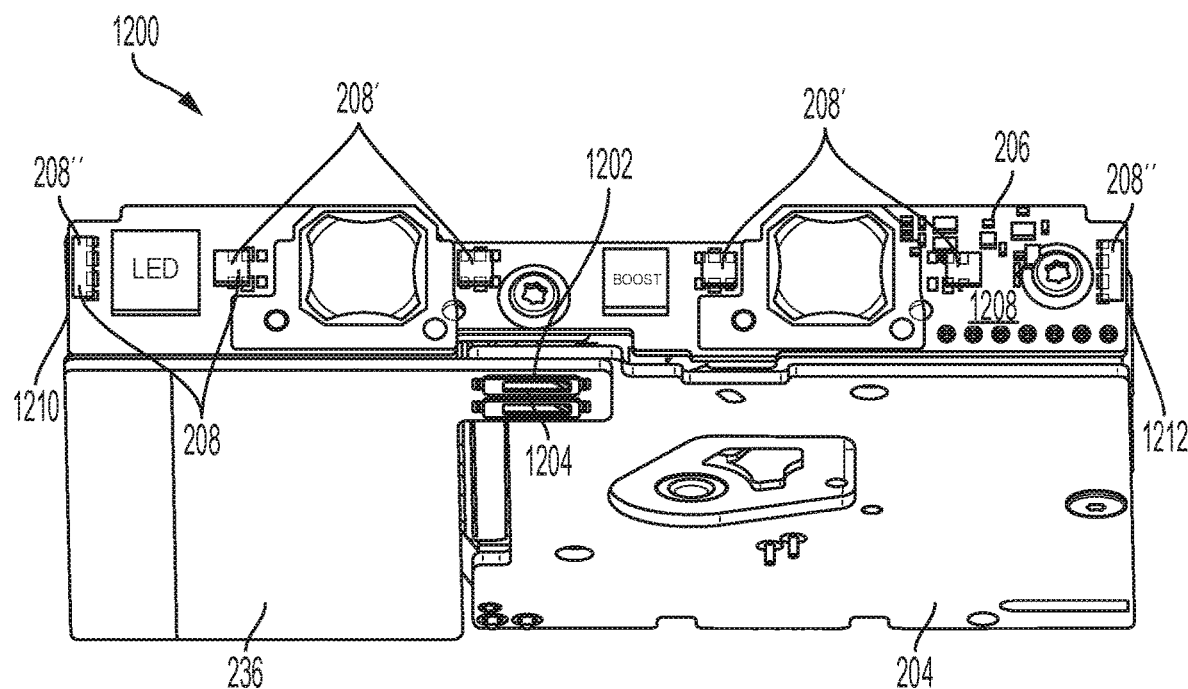
Figure 12D:
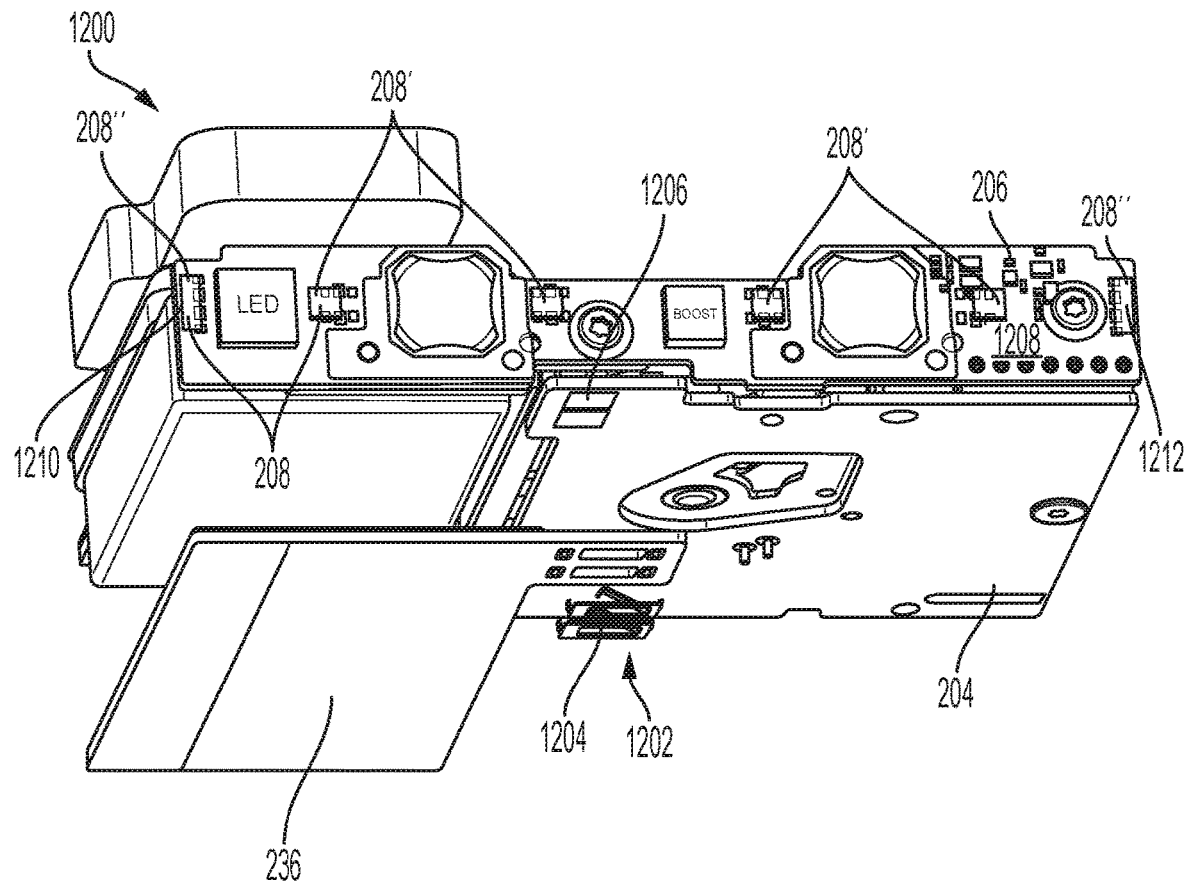

FIG. 11 is an illustration of a three-dimensional encoder 1100, in an example embodiment. Unlike the three-dimensional encoders 700, 900, the three-dimensional encoder 1100 utilizes tabs 1102 and gaps 1104 to provide surfaces or lack thereof from light is either reflected, in the case of the tabs 1102, or not reflected, in the case of the gaps 1104. The optical sensors 1106, 1108 detect the light reflected from the tabs 1102 and not the absence of reflected light when the gaps 1104 align with the optical sensors 1106, 1108. In an example, the optical sensor 1106, 1108 form an angle therebetween of approximately fifty-four (54) degrees. A beam break 1110 includes slits 1112 through which light passes to focus the light for the purposes of the focusing the light for detection by the optical sensors 1106, 1108. The three-dimensional encoder 1100 is rotationally coupled to the motor 228, as with the other encoders 700, 900.

FIGS. 12A-12D are perspective views of a lacing engine 1200, in an example embodiment. The views are exploded in FIGS. 12A and 12B. The recharge coil 236 is separated from the main PCB 204 in FIG. 12D. The lace engine 1200 may be utilized as the lace engine 102 or in any suitable system.

The lace engine 1200 includes components such as the main PCB 204, user interface PCB 206, motor 228, transmission 230, battery 234, and electrode 306. The spool 232 is secured to the transmission 230 via the set screw 302.

The dimensions of the lace engine 1200 may be the same or similar to those of the lace engine of FIGS. 5A and 5B. The lace engine 1200 may differ from the lace engine of FIGS. 5A and 5B in the inclusion of a spring contact interface 1202 between the main PCB 204 and the recharge coil 236. The spring contact interface 1202 includes a spring 1204 and pads 1206 and may promote a relatively stronger and resilient contact post-manufacture between the main PCB 204 and the recharge coil 236 in comparison to wire-bonded or other connections. The spring 1204 as illustrated is included on the recharge coil 236. However, the spring 1204 may be included on the main PCB 204 and the pads 1206 may be included on the recharge coil 236. In various examples, the wireless transceiver 220 may similarly be operatively coupled to the main PCB 204 via a spring contact interface 1202.

The lace engine 1200 may further differ from the lace engine of FIGS. 5A and 5B through the inclusion of additional LEDs 208. As illustrated, six (6) LEDs 208 are positioned on a side face 1208 of the lace engine 1200 and may be visible external to the article of footwear 198. Four of the LEDs 208' are positioned to emit generally perpendicular from the side face 1208 while two of the LEDs 208" are positioned to generally direct light to the lateral sides 1210, 1212 of the side face 1208. In the illustrated example, the LEDs 208 are positioned evenly spaced on the side face 1208 with the buttons 200 interspersed between the LEDs 208.

Additionally, the lace engine 1200 may include one or more haptic generators. The haptic generators may be or may include the motor 228 and/or components of the gearbox 230 which have been configured to generate a haptic sensation that is perceptible by a wearer of the article of footwear 198. Additionally or alternatively, one or more dedicated haptic motors may be positioned on or within the lace engine 1200. In an example, the haptic generator(s) are incorporated on the main PCB 204 proximate the encoder 210. The haptic generators may be utilized to provide various user interface experiences for the wearer of the article of footwear 198 or other user of the article of footwear 198. In various examples, the haptic generators may provide feedback about a charge state of the battery 234, an amount of tension on the lace 238, and instructions, e.g., during an athletic event. It is to be recognized and understood that haptic generators may also be incorporated in the alternative lace engines disclosed herein.

Figure 13A:
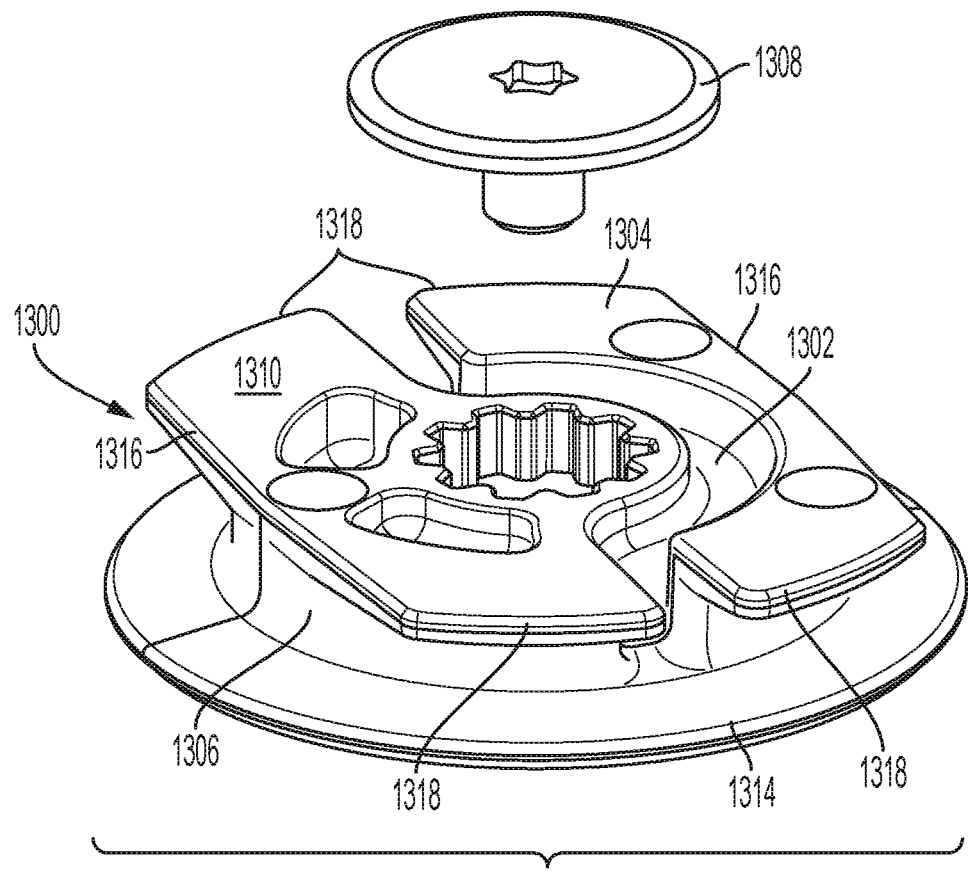
FIGS. 13A and 13B are exploded and side views of a spool, in an example embodiment.
Figure 13B:
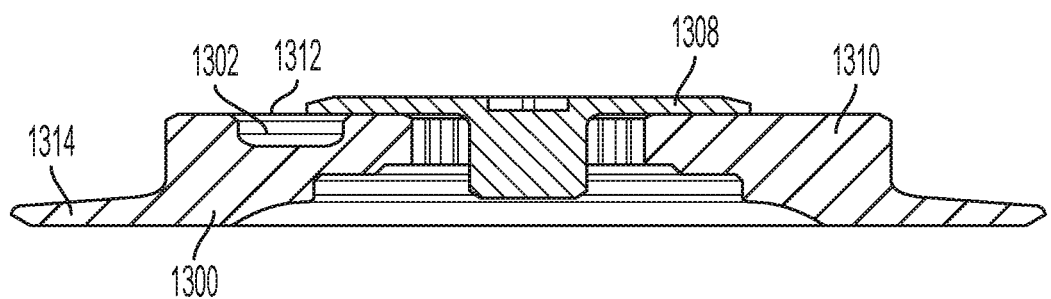

FIGS. 13A and 13B are exploded and side views of a spool 1300, in an example embodiment. The spool 1300 may be utilized as the spool 232 or as any suitable spool in an autolacing system or other system.

In the illustrated example, the spool 1300 is made from a single piece, e.g, of plastic or other suitable polymer, metal, or the like. The spool 1300 includes a top lace groove 1302 in the top surface 1304 into which the lace 238 is inserted and secured. The lace 238 may then be taken up around the circumferential channel 1306 of the spool 1300 by turning the spool 1300 with the motor 228 and gearbox 230.

The spool 1300 is coupled the gearbox 230 via a fastener 1308. As illustrated, the fastener 1308 is a screw, though it is to be recognized and understood that any suitable fastener may be utilized in various examples. The fastener 1308 includes a head 1310 having a head width sufficiently large to overlay, at least in part, a curved portion of the lace groove 1302, to help secure, at least in part, the lace 238 within the lace groove 1302. As illustrated, the head 1310 is circular, though in various examples the head 1310 may be alternative shapes, such as square, hexagonal, or any regular or irregular shape, as desired.

As illustrated in FIG. 13B, the head 1310 aligns with and partially covers the lace groove 1302, leaving a top gap 1312 having a gap width at least somewhat less than a thickness of the lace 238, providing in conjunction with the spool 1300 a mild friction fit of the lace 238 within the lace groove 1302. As such, in various implementations, a user could insert the lace 238 into the lace groove 1302 by applying a relatively modest amount of downforce on the lace 238 to overcome the friction on the fastener 1308. Upon being inserted, the lace 238 would tend to be restrained within the lace groove 1302 unless an upward force on the lace 238 was sufficient to overcome the friction on the lace 238 by the fastener 1308. Alternatively, the spool 1300 may utilize a screw that does not have a head width sufficient to overall the lace groove 1302. Such a spool 1300 may rely, at least in part, on the lid 104 to restrain the lace 238 within the lace groove 1302.

While a bottom flange 1314 of the spool is circular, the top surface 1304 is circular but with two truncated edges 1316 between two rounded edges 1318. In the illustrated example, the lace groove 1302 extends between the rounded edges 1318 at the midpoints between the truncated edges 1316. However, it is to be recognized that the lace groove 1302 may extend between the truncated edges 1316. The truncated edges may promote a relatively more robust design that a similar spool 1300 with a circular top surface 1304 and better ease of manufacturing.

Figure 14:
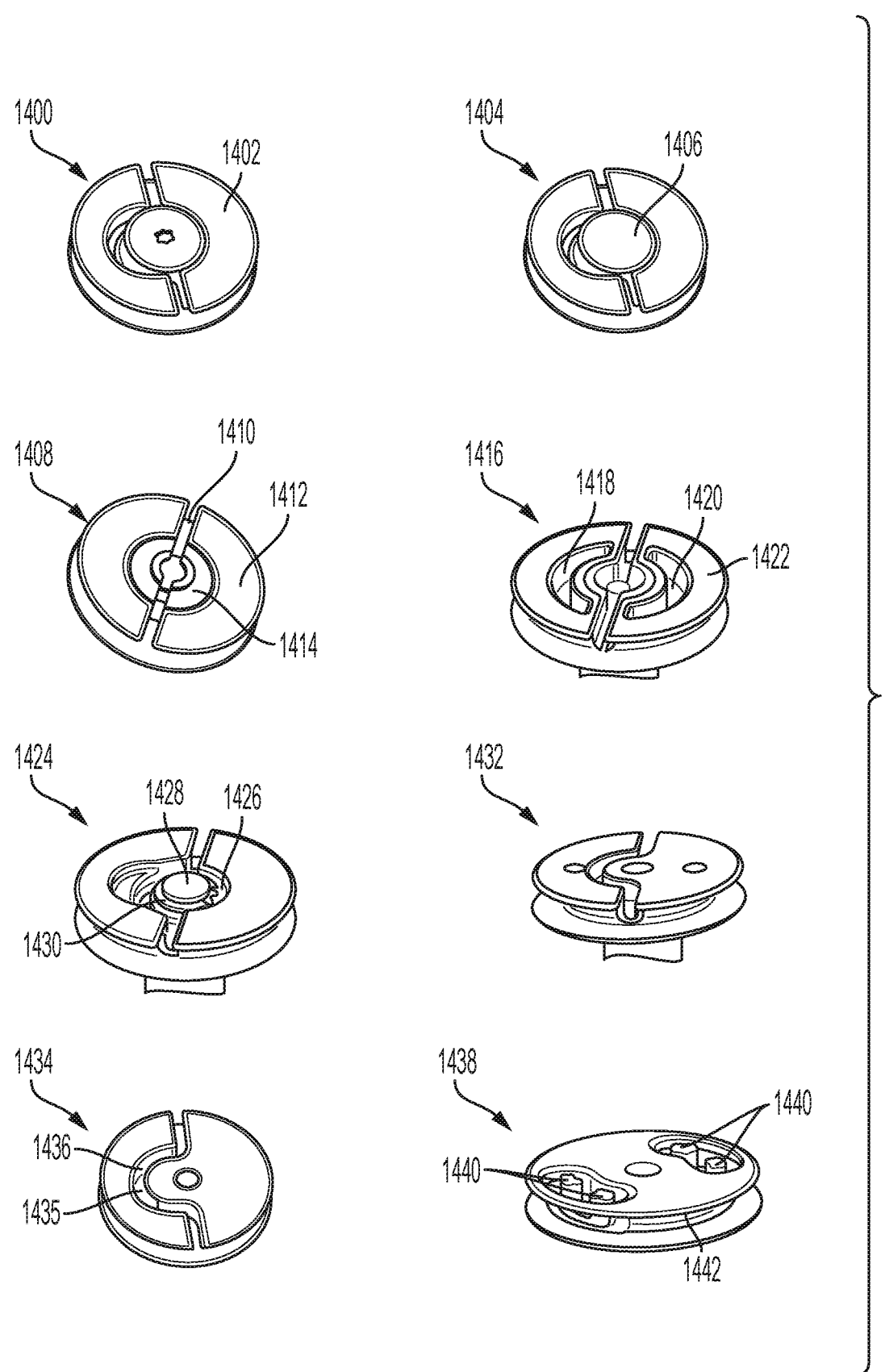
FIG. 14 illustrates alternative examples of the spool.

FIG. 14 illustrates alternative examples of the spool 232. Each of the spools may be manufactured from a single piece, e.g, of plastic or other suitable polymer, metal, or the like. Each spool may be utilized in place of the various spools disclosed herein.

Spool 1400 is a flanged screw spool. The spool 1400 is otherwise similar to the spool 1300 but has a fully circular top surface 1402. The spool 1400 may incorporate a relatively larger torx drive, retention force on the lace 238, and a relatively flush volumetric profile relative to other spools.

Spool 1404 incorporate elements of the spool 1400 but utilizes a press-fit cap 1406 to couple the spool 1404 to the gearbox 230 rather than a screw. The press-fit cap 1406 may be any suitable press-fit mechanism known in the art. The press-fit cap 1406 may provide a relatively simple assembly process and is relatively low-cost relative to other fasteners.

Spool 1408 incorporate elements of the spool 1404 but utilizes a lace groove 1410 that extends across a diameter of the top surface 1412 and across a press-fit cap 1414. In such an example, the press-fit cap 1414 would not provide any restraint on the lace 238 within the lace groove 1410.

Spool 1416 incorporate elements of the spool 1408 but includes cutouts 1418, 1420 in the top surface 1422. The cutouts 1418, 1420 may promote reduced material use relative to the spool 1408.

Spool 1424 incorporate elements of spool 1400 but incorporates a circumferential channel 1426 proximate an axis 1428 of the spool 1424 to allow for the spool 1424 to be coupled to the gear box 230 with a c-clip fastener 1430.

Spool 1432 incorporate elements of the spools 1400 and 1408 but incorporates an integrated fastener (obscured) into the structure of the spool 1432 rather than requiring a separate fastener, such as a screw, press-fit cap, or c-clip fastener disclosed herein. The fastener as incorporated may be any suitable fastener which may be incorporated into the structure of the spool 1432. In various examples, the integrated fastener is a press-fit fastener.

Spool 1434 incorporate elements of the spool 1432 but incorporates a cutout 1435 in the lace groove 1436.

Spool 1438 incorporates posts 1440 within the circumferential channel 1442 to retain the lace 238 on the spool 1438. Portions of the lace 238 may be threaded through the posts 1440 and/or through resultant secondary channels 1442 in order to partially secure the lace 238 to the spool 1438 and allow the lace 238 to be taken up around the circumferential channel 1442.

Figure 15:
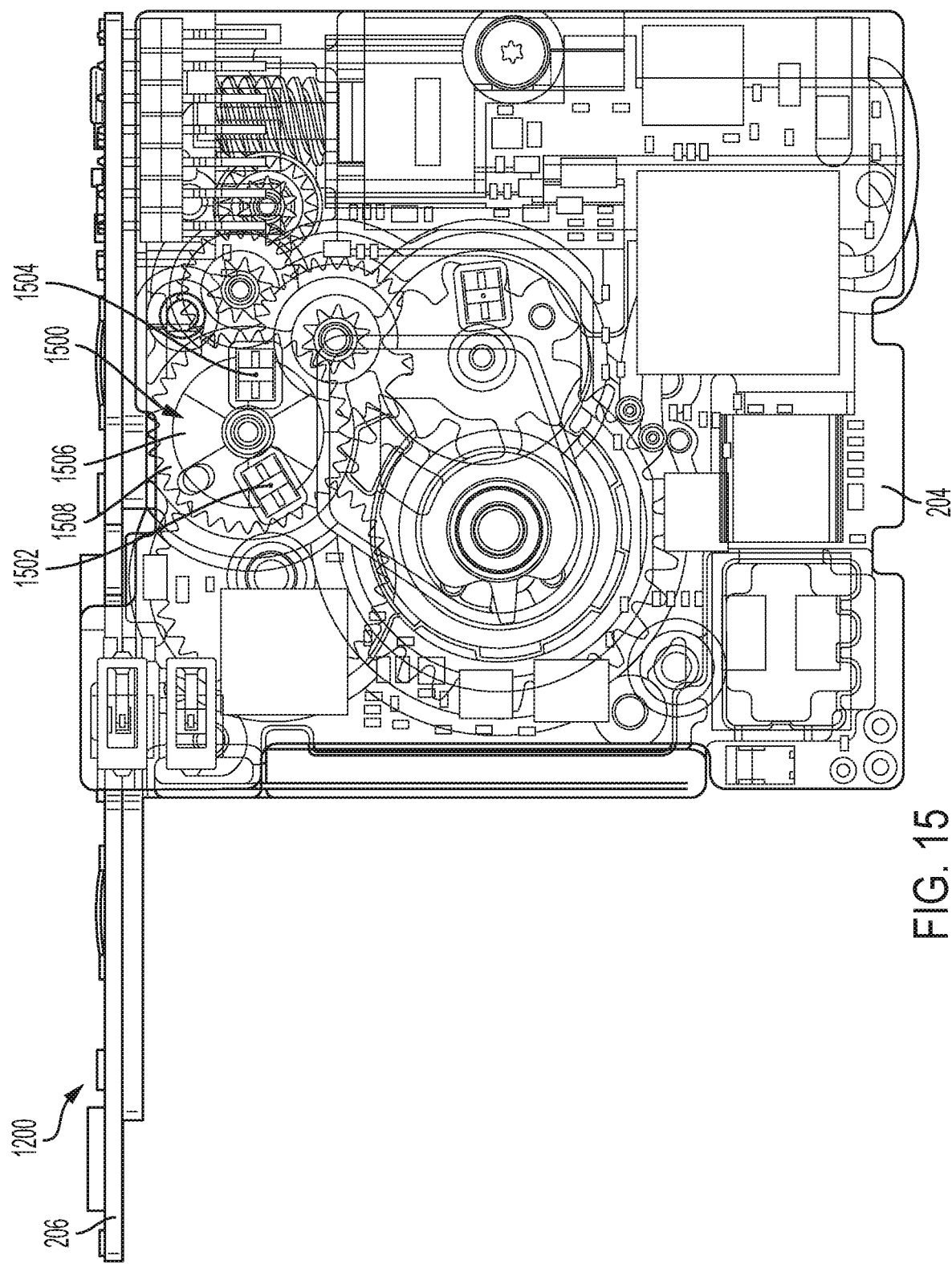
FIG. 15 is a cutaway view of a portion of the lace engine illustrating an example of the encoder.

FIG. 15 is a cutaway view of a portion of the lace engine 1200 illustrating an example of the encoder 210. The encoder 1500 as illustrated is a two-dimensional encoder, in contrast to the various three-dimensional encoders disclosed herein, in that the optical sensors 1502, 1504 are configured to sense the position and orientation of a two-dimensional optical encoder unit 1506. The optical encoder unit 1506 is positioned on one of the gears 1508 of the transmission 230. The optical sensors 1502 are positioned on the same major surface 1508 of the PCB 204 and both are optically sensitive in the same orthogonal direction from the major surface 1508.

The two-dimensional optical encoder unit 1506 may be configured to be optically sensitive to the optical sensors 1502, 1504 according to the three-dimensional optical encoder units disclosed herein, e.g., with alternative light and dark segments, or according to any suitable mechanism known in the art or that may be developed. The segments may be sized so that each of the optical sensor 1502, 1504 will tend to sense the same type of segment, i.e., each sense a light segment or each sense a dark segment, but not one light and one dark. Alternatively, the optical sensors 1502, 1504 may be spaced on the PCB 204 so that the optical sensors each sense the same type of segment. Further alternatively, the segments may be sized and/or the optical sensors 1502, 1504 may be spaced so that each optical sensors 1502, 1504 senses a different type of segment.

Figure 16A:
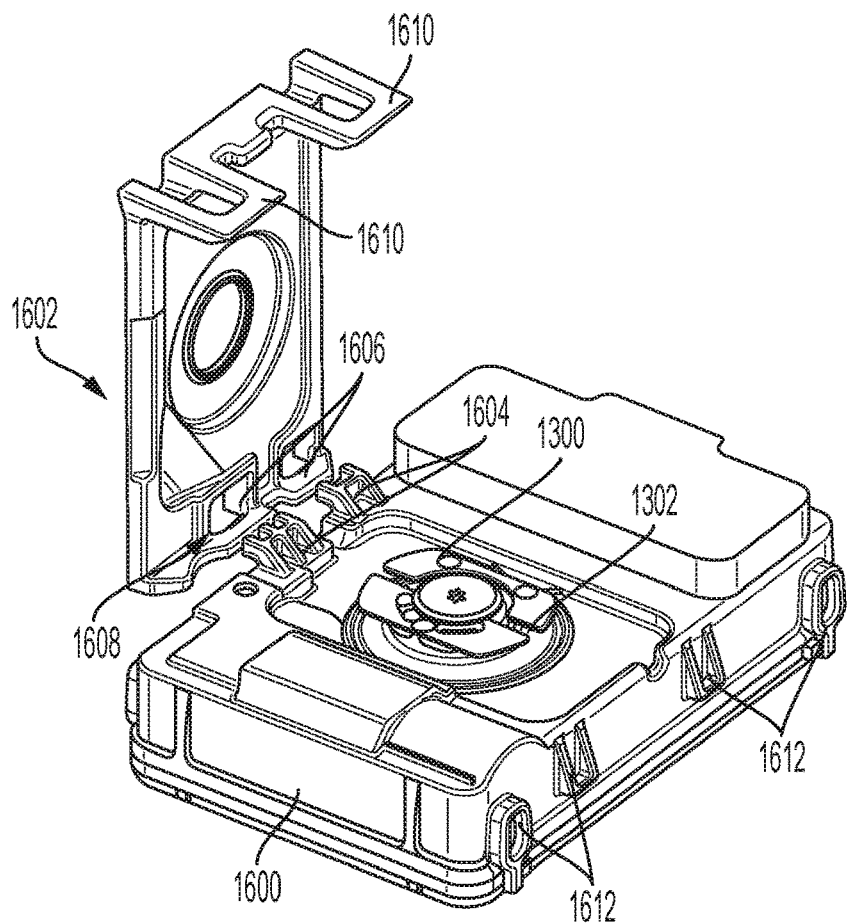
FIGS. 16A and 16B are a depiction of a lace engine housing and lid for the lace engine, in an example embodiment.
Figure 16B:
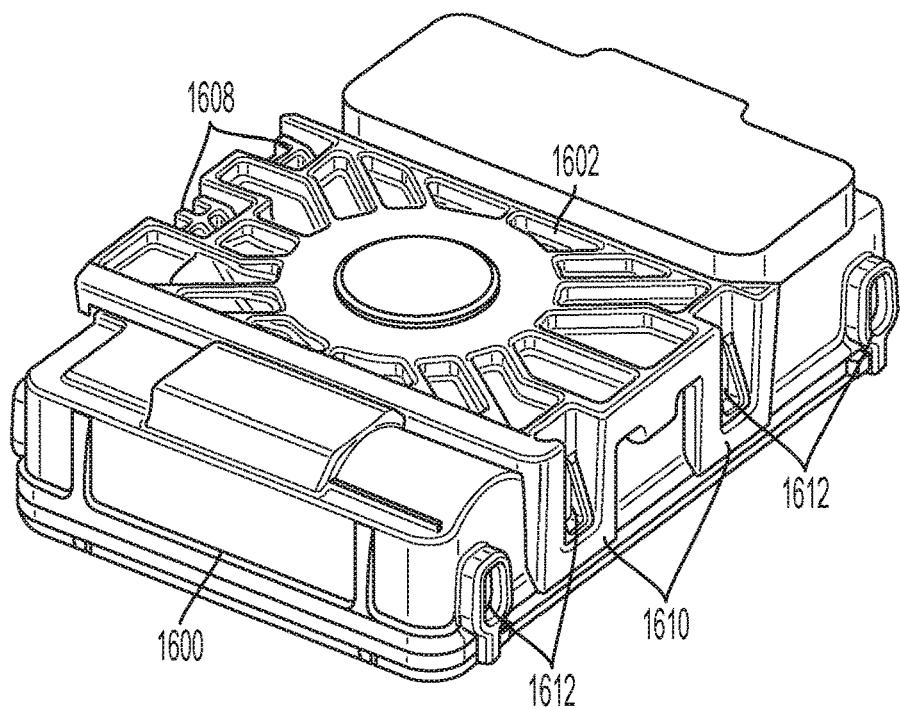

FIGS. 16A and 16B are a depiction of a lace engine housing 1600 and lid 1602 for the lace engine 1200, in an example embodiment. The lace engine housing 1600 and the lid 1602 may be utilized as the housing 103 and the lid 104 in the block diagram of FIG. 2, respectively. The lace engine housing 1600 may be sized to enclose the lace engine 1200 or any suitable lace engine. The lace engine housing 1600 includes tabs 1604 that mate, e.g., via snap-fit, with pins 1606 on the lid 1602 to form hinges 1608 about which the lid 1602 may rotate relative to the housing 1600.

FIG. 16A illustrates the lid 1602 in an open configuration, with the spool 1300 exposed and the lace 238 (not pictured) either accessible or able to be placed in the lace groove 1302. FIG. 16B illustrates the lid 1602 in a closed configuration, with tabs 1610 snapped into place on a side 1612 of the housing 1600. In the closed configuration, the lid 1602 may tend to restrain the lace 238 within the lace groove 1302.

The housing 1600 and lid 1602 may be made of any suitable material, including plastic or other polymer and metal, as appropriate. The housing 1600 and/or the housing 1600 and lid 1602 together may provide at least some isolation for the lace engine 1200 against environmental conditions, such as moisture or sweat, as well as against forces that may be exerted against the housing 1600, including impacts and mechanical stresses. The housing 1600 may also be placed within a sleeve or other structure that may provide for environmental isolation.

As illustrated, the housing 1600 includes apertures 1612 to allow light emitted from the LEDs 208 to be visible outside of the housing 1600. In the illustrated example, two of the apertures 1612 align with the tabs 1610.

Figure 17:
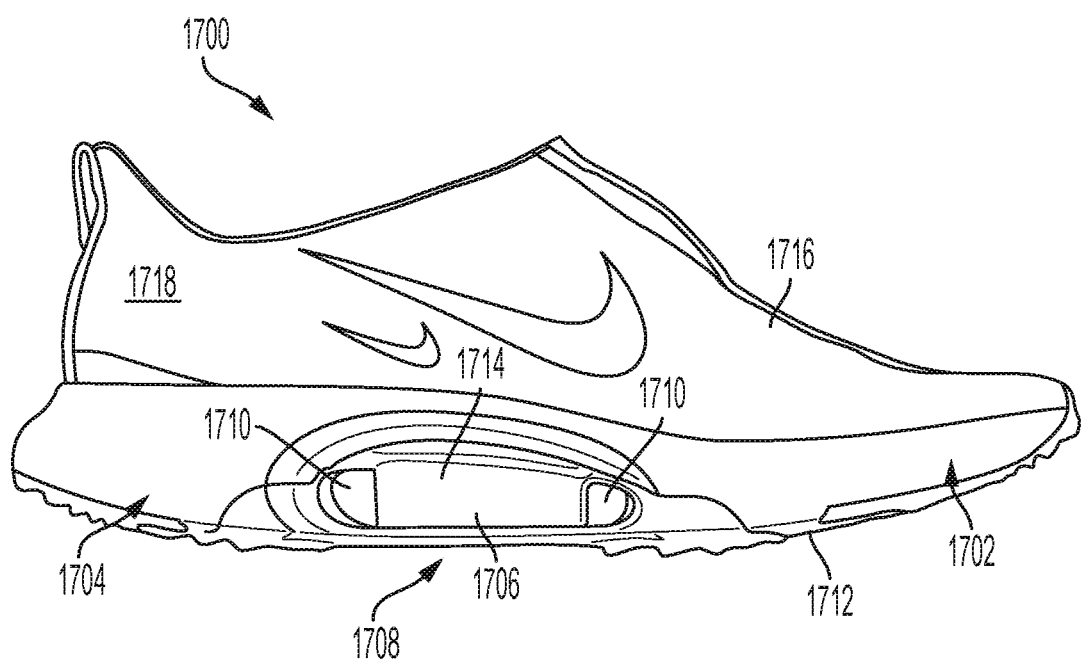
FIG. 17 is a side profile of an article of footwear including the lace engine or the lace engine, in various examples.

FIG. 17 is a side profile of an article of footwear 1700 including the lace engine 102 or the lace engine 1200, in various examples. The article of footwear 1700 may be a specific but non-limiting example of the article of footwear 198.

The article of footwear 1700 includes a sole with a forefoot section 1702, a heel section 1704, and a cutout segment 1706 in the midsole 1708. The lace engine 1200 positioned within the housing 1600 may be placed within the cutout segment 1706, with gaps 1710 providing medial-to-lateral visibility through the midsole 1708. A tread 1712 or other elongate member extends across the forefoot section 1702, midsole 1708, and heel section 1704 to provide traction with a surface on which the article of footwear 1700 may be placed.

In the illustrated example, the cutout segment 1706 includes an at least partially translucent film 1714 or other barrier between the housing 1600 and external environmental conditions. In examples in which the housing 1600 is enclosed within a sleeve, the sleeve may similarly be at least partially translucent. The shining of the light emitted by the LEDs 208 may be visible through the film 1714. The film 1714 may, in various examples, provide for diffusion of the light from the LEDs 208 in order to provide a more even diffusion of the light emitted by the LEDs 208 than may be obtainable by the LEDs 208 alone.

In addition to the structures descripted above, the article of footwear 1700 includes various additional structures, including an upper 1716 through which the lace 238 may be routed. The upper 1716 as illustrated includes an outer shell 1718, which may be comprised of any material as desired for structural or aesthetic purposes, including a textile, such as a knit textile, leather, and the like.

Figure 18:
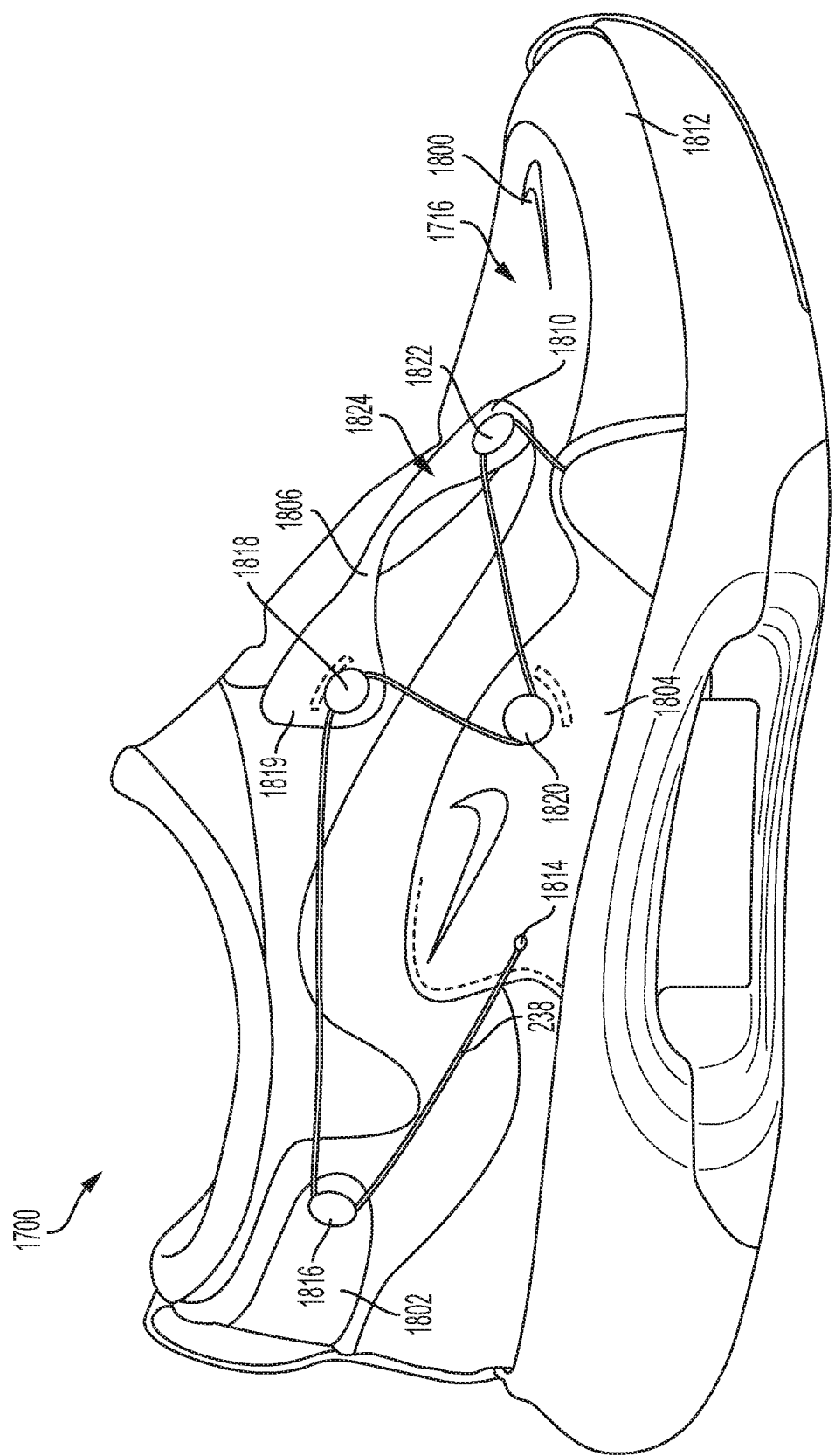
FIG. 18 is a depiction of the lacing architecture of the article of footwear, in an example embodiment.

FIG. 18 is a depiction of the lacing architecture of the article of footwear 1700, in an example embodiment. The lacing architecture may be positioned between the outer shell 1718, which has been removed for the purposes of illustration, and an inner structure 1800 of the upper 1716. The inner structure 1800 may provide some measure of structural rigidity for the upper 1716 in general. As illustrated, the inner structure 1800 includes a heel strap 1802, a midfoot flap 1804, and a throat flap 1806, all made from a relatively more structurally-rigid material, such as leather or synthetic leather, and a textile portion or portions extending between the other components of the inner structure 1800. As can be seen from the illustration, the throat flap 1806 has a connection point 1810 proximate a toe region 1812 but is enabled to swing, at least in part, about the connection point 1810 based on an amount of tension on the lace 238.

The lacing architecture includes lace guides though which the lace 238 is routed. Upon exiting the lace engine 1200 and then passing through an aperture 1814 in the midfoot flap 1804, the lace 238 passes through a first lace guide 1816 on the heel strap 1802, a second lace guide 1818 on a distal end 1819 of the throat flap 1806, a third lace guide 1820 on the midfoot flap 1804, and a fourth lace guide 1822 on a proximal end 1824 of the throat flap 1806. The lace 238 is secured to the upper 1716 on the midfoot flap 1804.

The lace guides 1816, 1818, 1820, 1822 may be made in any suitable configuration to retain the lace 238 within the lace guide 1816, 1818, 1820, 1822 while allowing the lace 238 to slide through the lace guide 1816, 1818, 1820, 1822 when tension is placed on the lace 238, e.g., by the lace engine 1200. In the illustrated example, the lace guides 1816, 1818, 1820, 1822 are pivot-style lace guides, with a post on a central axis between to parallel discs around which the lace 238 curves in order to be redirected to another one of the lace guides 1816, 1818, 1820, 1822. The pivot-style may optionally rotate, e.g., incorporate a wheel-and-axel construction as in a pulley. A restraining member, e.g., a second post positioned away from the central axis of the pulley, may restrain the lace 238 within the lace guide 1816, 1818, 1820, 1822 if the lace 238 is threaded between the central post and the second post.

Figure 19A:
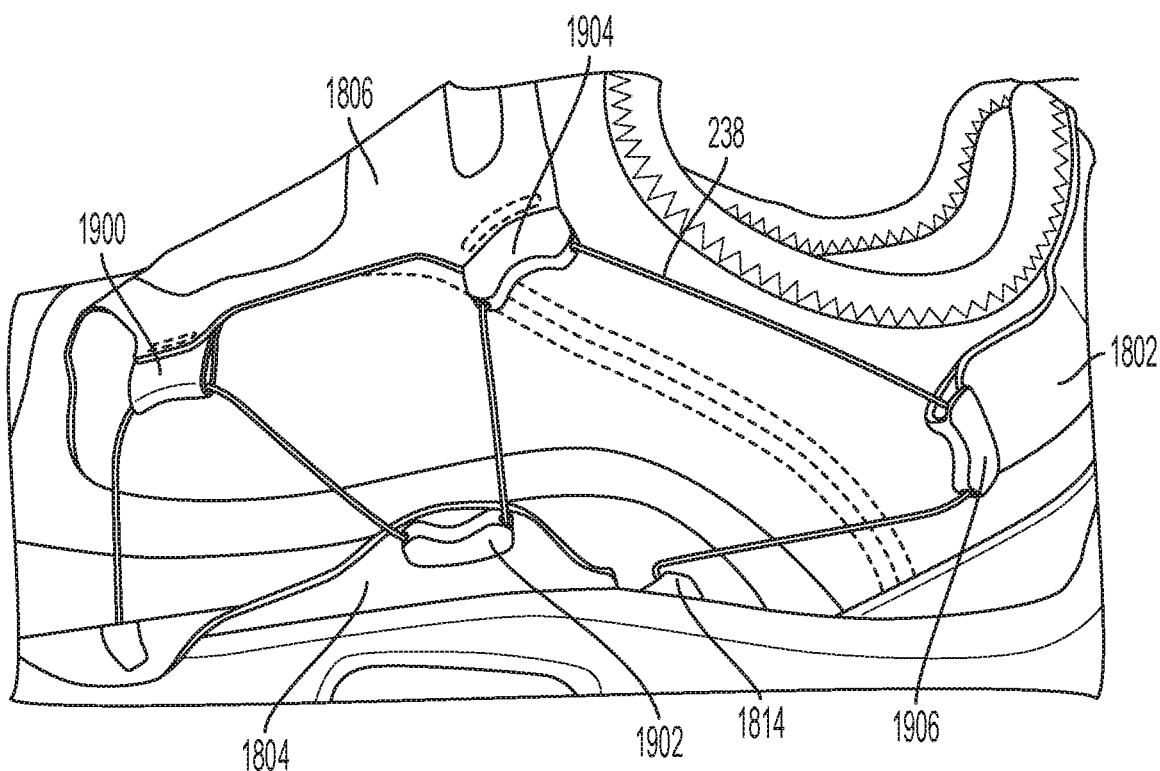
FIGS. 19A and 19B are images of an alternative lacing architecture, in an example embodiment.
Figure 19B:
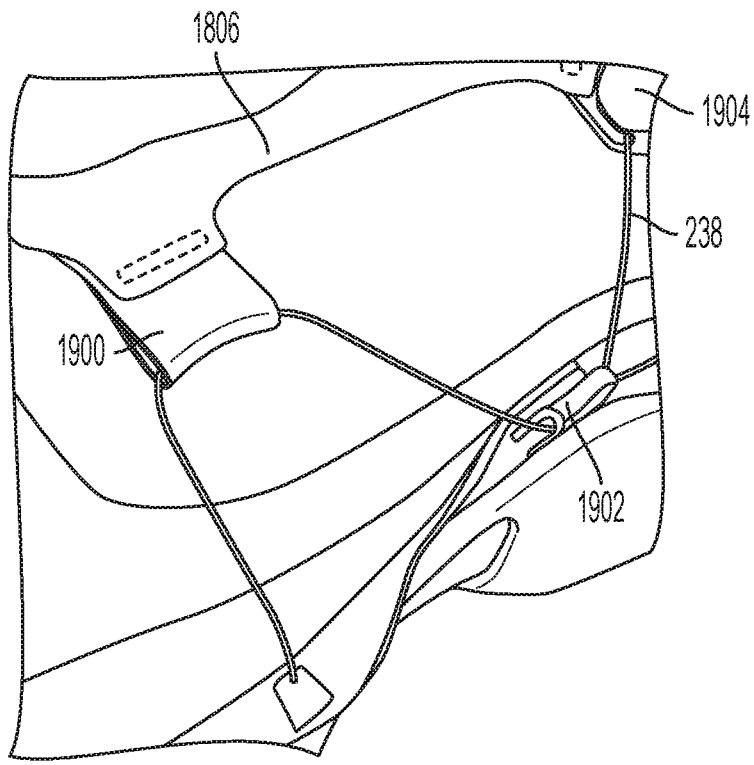

While the lacing architecture is depicted from the lateral side of the article of footwear 1700, it is to be recognized and understood that the same or similar pattern may be repeated on the medial side of the article of footwear 1700. Alternatively, the medial side may have a different pattern FIGS. 19A and 19B are images of an alternative lacing architecture, in an example embodiment. The lacing architecture includes a similar routing pattern to the example of FIG. 18 but with different lace guides. The lace guides include a fabric loop lace guide 1900 positioned on the throat flap 1806 and tubular lace guides 1902, 1904, 1906 positioned on the midfoot flap 1804, throat flap 1806, and heel strap 1802. The lace 238 accesses the lace engine 1200 via the aperture 1814 and is secured on the midfoot flap 1804.

Figure 20:
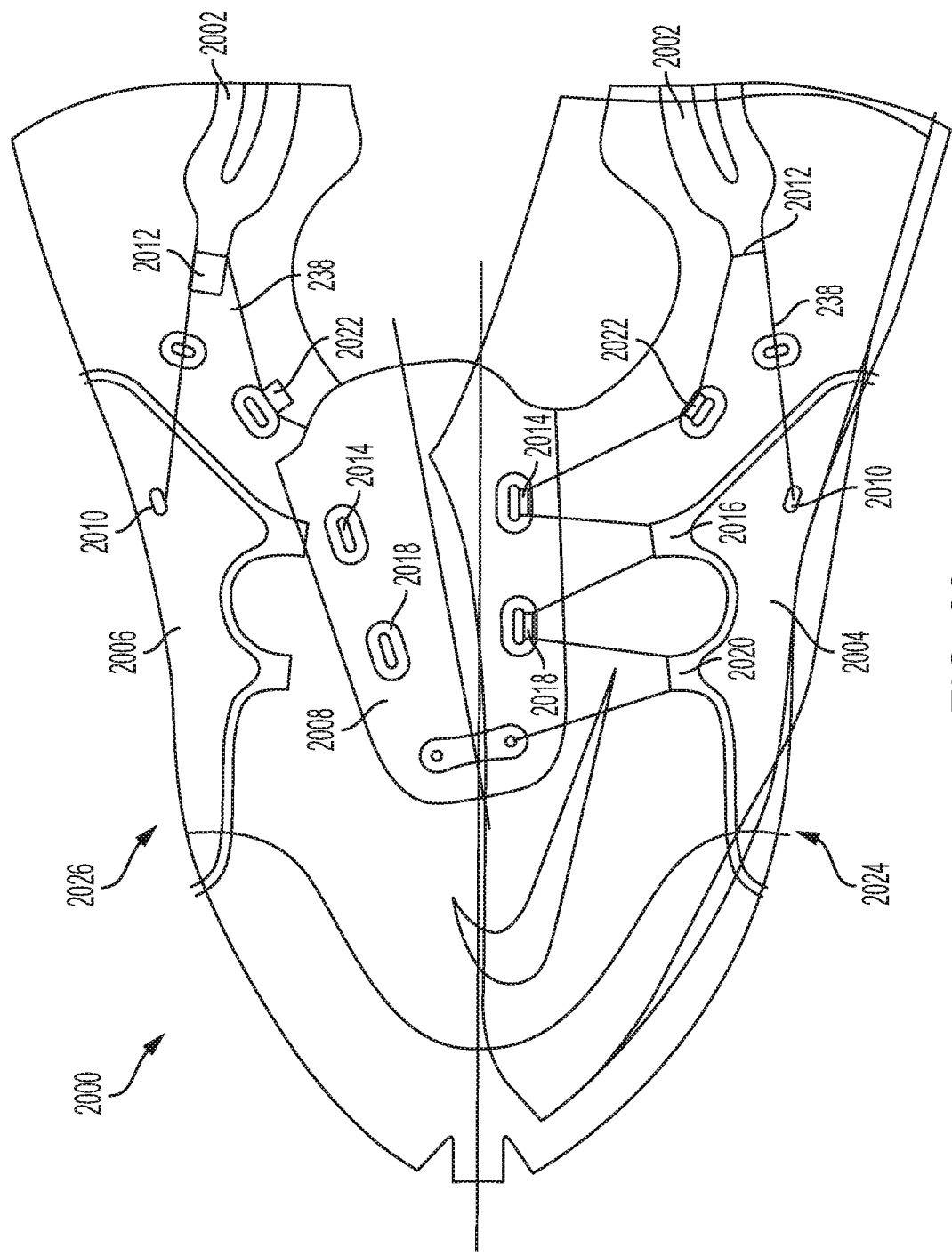
FIG. 20 is a line drawing of a lacing architecture, in an example embodiment.

FIG. 20 is a line drawing of a lacing architecture, in an example embodiment. The lace architecture is depicted on an upper 2000 that may be utilized as the upper on the article of footwear 1700 or as part of any suitable article of footwear 198. The upper 2000 is similar to the upper 1716, with certain differences disclosed below. The upper 2000 includes a heel strap 2002, a medial midfoot flap 2004, a lateral midfoot flap 2006, and a throat flap 2008. The lace 238 exits the lace engine 1200 via apertures 2010 and, on each side routes through a first lace guide 2012 on the heel strap 2002, a second lace guide 2014 on a distal end of the throat flap 2008, a third lace guide 2016 on the each midfoot flap 2004, 2006, a fourth lace guide 2018 on a middle region of the throat flap 2008, a fifth lace guide 2020 on each midfoot flap 2004, 2006, and finally are secured on a proximal end of the throat flap 2008. The upper 2000 further optionally includes an intermediate lace guide 2022 between first lace guide 2012 and the second lace guide 2014.

It is noted that while the lace 238 is depicted as running through the complete length of the lacing architecture on the medial side 2024, the lace 238 is omitted from much of the lacing architecture on the lateral side 2026 for the purposes of providing clarity of the components. The various lace guides may be any suitable lace guides. As illustrated, the first, third, and fifth lace guides 2012, 2016 are fabric loops while the second, third, and intermediate lace guides 2014, 2018, 2022 are tubular lace guides. However, it is to be recognized and understood that some or all of the lace guides 2012, 2014, 2016, 2018, 2020, 2022 may be any of the lace guide types disclosed herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An article of footwear, comprising:
   an upper portion including a lace to adjust a fit of the upper portion against a foot;
   a lower portion including a mid-sole and an out-sole, the lower portion coupled to the upper portion at the mid-sole; and
   a lacing engine removably receivable within a lacing engine cavity, wherein the lacing engine includes:
   a motor;
   a transmission, operatively coupled to the motor;
   a lace spool, operatively coupled to the transmission, including a top lace groove in a top surface of the lace spool, a bottom surface coupled to the top surface; wherein the top surface and the bottom surface rotate together, and a circumferential channel formed between the top surface and the bottom surface, wherein the lace is configured to be inserted in the top lace groove and be taken up around the circumferential channel based on a turning of the lace spool from action by the motor and transmission; and
   a fastener, configured to couple the lace spool to the transmission, inserted into the lace spool via the top surface, the fastener having a head having a head width sufficient to partially cover the top lace groove, leaving a top gap having a gap width less than a thickness of the lace.

2. The article of footwear of claim 1, wherein the head has a circular shape that aligns with and covers in part a curved portion of the top lace groove.

3. The article of footwear of claim 2, wherein the top lace grove includes straight portions between an edge of the lace spool and the curved portion.

4. The article of footwear of claim 3, wherein the lace enters the top lace groove at the straight portions of the top lace groove.

5. The article of footwear of claim 3, wherein the top surface includes two rounded edges between two truncated edges, and wherein the top lace groove extends between the two rounded edges.

6. The article of footwear of claim 5, wherein the bottom surface further comprises a bottom flange and wherein the circumferential channel is formed between the bottom flange and the top surface.

7. The article of footwear of claim 1, wherein the fastener is a screw.

* * * * *